United States Patent
Singh et al.

(10) Patent No.: US 11,455,172 B2
(45) Date of Patent: Sep. 27, 2022

(54) METHOD AND APPARATUS FOR MANAGING SCHEDULING OF SERVICES DURING BOOT-UP

(71) Applicant: Samsung Electronics Co., Ltd., Suwon-si (KR)

(72) Inventors: Atikant Singh, Bangalore (IN); Anuradha Kanukotla, Bangalore (IN); Hyunjoon Kim, Suwon-si (KR); Kyungseok Lee, Hwaseong-si (KR); Ramalingam Ramamoorthy, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 16/635,794

(22) PCT Filed: Aug. 16, 2018

(86) PCT No.: PCT/KR2018/009397
§ 371 (c)(1),
(2) Date: Jan. 31, 2020

(87) PCT Pub. No.: WO2019/035660
PCT Pub. Date: Feb. 21, 2019

(65) Prior Publication Data
US 2021/0132956 A1   May 6, 2021

(30) Foreign Application Priority Data

Aug. 16, 2017   (IN) .............................. 201741029059
Aug. 14, 2018   (IN) .............................. 2017 41029059

(51) Int. Cl.
*G06F 9/4401*   (2018.01)
*G06F 9/48*   (2006.01)

(52) U.S. Cl.
CPC .......... *G06F 9/4405* (2013.01); *G06F 9/4881* (2013.01)

(58) Field of Classification Search
None
See application file for complete search history.

(56) References Cited

U.S. PATENT DOCUMENTS 9,965,329 B2 *   5/2018   Blagodurov .......... G06F 9/5038
2012/0260080 A1 *   10/2012   Myadam ............... G06F 9/4401
713/2

(Continued)

OTHER PUBLICATIONS

European Search Report dated Jul. 22, 2020, issued in European Patent Application No. 18847032.2.

(Continued)

*Primary Examiner* — Fahmida Rahman
(74) *Attorney, Agent, or Firm* — Jefferson IP Law, LLP

(57) ABSTRACT

Accordingly the embodiments herein provide a method for managing scheduling of services during a boot-up process in an electronic device including a multi-core processor. The method includes determining a plurality of services initiated during the boot-up process of the electronic device. Further, the method includes registering system parameters associated with the electronic device for each one of the determined services. Further, the method includes determining whether the service is critical or non-critical for the boot-up process. Further, the method includes tagging a label data to each one of the determined services, wherein the label data represents whether the service is critical or non-critical. Further, the method includes clustering each of the services into one of an accelerating cluster and a decelerating cluster based on the registered system parameters associated with the electronic device and the tagged label data.

20 Claims, 19 Drawing Sheets

(56) References Cited

U.S. PATENT DOCUMENTS

| | | |
|---|---|---|
| 2014/0059558 A1 | 2/2014 | Davis et al. |
| 2015/0040136 A1 | 2/2015 | Matthes et al. |
| 2016/0217626 A1 | 7/2016 | Cancilla et al. |
| 2017/0090988 A1 | 3/2017 | Young et al. |
| 2017/0102971 A1 | 4/2017 | Blagodurov |
| 2017/0124478 A1 | 5/2017 | Baradaran et al. |
| 2018/0365035 A1* | 12/2018 | Liu ..................... G06F 9/4406 |

OTHER PUBLICATIONS

Indian Office Action dated Feb. 19, 2021, issued in Indian Patent Application No. 201741029059.

* cited by examiner

| Services | CPU Load % | Memory utilization factor | Parallelizibility factor | Labelled data | Cluster |
|---|---|---|---|---|---|
| messengerapp | 3.7 | 133,158K | 1 | 0 | new |
| systemserver | 0.9 | 25,252K | 1 | 1 | 1 |
| zygot64 | 7.4 | 16,750K | 1 | 1 | 1 |
| cameraserver | 1.2 | 15,302K | 1 | 0 | 1 |
| nfc | 1.7 | 20,779K | 0 | 0 | 2 |
| bluetooth | 1.9 | 10,933K | 0 | 0 | 2 |
| audioserver | 4.2 | 74,407K | 1 | 0 | 2 |
| messaging | 0.7 | 56,197K | 0 | 0 | 2 |
| incallui | 2.6 | 32,060K | 1 | 0 | 2 |

FIG.10A

| Services | CPU Load % | Memory utilization factor | Parallelizibility factor | Labelled data | Cluster |
|---|---|---|---|---|---|
| whatsapp | 3.7 | 133,158K | 1 | 0 | new |
| systemserver | 0.9 | 25,252K | 1 | 1 | 1 |
| zygot64 | 7.4 | 16,750K | 1 | 1 | 1 |
| cameraserver | 1.2 | 15,302K | 1 | 0 | 1 |
| nfc | 1.7 | 20,779K | 0 | 0 | 2 |
| bluetooth | 1.9 | 10,933K | 0 | 1 | 1 |
| audioserver | 4.2 | 74,407K | 1 | 0 | 2 |
| messaging | 0.7 | 56,197K | 0 | 0 | 2 |
| incallui | 2.6 | 32,060K | 1 | 0 | 2 |

FIG.12

METHOD AND APPARATUS FOR MANAGING SCHEDULING OF SERVICES DURING BOOT-UP

TECHNICAL FIELD

The present disclosure relates to booting of a computing device, and more specifically to method and apparatus for managing scheduling of services during boot-up.

BACKGROUND ART

When an electronic device is turned on, the electronic device undergoes a booting process before starting normal operations. Booting time of the electronic device is one of the major factors in determining a performance of the electronic device.

DISCLOSURE OF INVENTION

Technical Problem

An aspect of the present disclosure is to provide method and apparatus for managing scheduling of services during boot-up.

Another aspect of the present disclosure is to provide a method and apparatus for managing scheduling of services during a boot-up process in an electronic device including a multi-core processor.

Another aspect of the present disclosure is to provide method and apparatus for determining a plurality of services initiated during the boot-up process of the electronic device and registering the system parameters associated with the electronic device including a central processing unit (CPU) load, a parallelizability factor, and a memory utilization factor for each of the determined services.

Another aspect of the present disclosure is to provide method and apparatus for determining whether a service is critical or non-critical for the boot-up process.

Another aspect of the present disclosure is to provide method and apparatus for tagging a label data to each one of the determined services to represent whether the service is critical or non-critical.

Another aspect of the present disclosure is to provide method and apparatus for clustering each of the services into one of an accelerating cluster and a decelerating cluster based on the registered system parameters and the tagged label data.

Another aspect of the present disclosure is to provide method and apparatus for determining a plurality of new services initiated during the subsequent boot-up process of the electronic device.

Another aspect of the present disclosure is to provide method and apparatus for dynamically updating the determined new services during the subsequent boot-up process in one of the accelerating cluster and the decelerating cluster based on system parameters associated with the electronic device for each one of the determined new services and tagged label data during the subsequent boot-up process.

Another aspect of the present disclosure is to provide method and apparatus for scheduling the services available in the accelerating cluster using at least one big core of the multi-core processor and the services available in the decelerating cluster using at least one small core of the multi-core processor during the subsequent boot-up process.

Solution to Problem

Accordingly the embodiments herein provide a method for managing scheduling of services during a boot-up process in an electronic device including a multi-core processor. The method includes determining a plurality of services initiated during the boot-up process of the electronic device. Further, the method includes registering system parameters associated with the electronic device for each one of the determined services. Further, the method includes determining whether the service is critical or non-critical for the boot-up process. Further, the method includes tagging a label data to each one of the determined services, where the label data represents whether the service is critical or non-critical. Further, the method includes clustering each of the services into one of an accelerating cluster and a decelerating cluster based on the registered system parameters associated with the electronic device and the tagged label data.

In an embodiment, the method further includes detecting a subsequent boot-up process at the electronic device. Further, the method includes determining services available in the accelerating cluster and services available in the decelerating cluster. Further, the method includes scheduling the services available in the accelerating cluster using at least one big core of the multi-core processor and the services available in the decelerating cluster using at least one small core of the multi-core processor during the subsequent boot-up process.

In an embodiment, the method further includes determining a plurality of new services initiated during the subsequent boot-up process of the electronic device. Further, the method includes registering system parameters associated with the electronic device for each one of the determined new services during the subsequent boot-up process. Further, the method includes tagging a label data to each one of the determined new services during the subsequent boot-up process as critical or non-critical. Further, the method includes dynamically updating the determined new services during the subsequent boot-up process in one of the accelerating cluster and the decelerating cluster based on the system parameters associated with the electronic device for each one of the determined new services and the tagged label data during the subsequent boot-up process.

In an embodiment, the system parameters associated with the electronic device include at least one of a CPU load, a parallelizability factor, and a memory utilization factor.

In an embodiment, each of the services is clustered into one of the accelerating cluster and the decelerating cluster by feeding the registered system parameters associated with the electronic device and the tagged label data in to a four Dimensional (4D) clustering model, creating a 4D map by plotting data points representing the services on four axis of the 4D clustering model based on the registered system parameters associated with the electronic device and the tagged label data, determining a cluster center when at least two data points are greater than a threshold, where the cluster center is shifted according to a distance between the data points and the cluster center, and clustering the data points representing the services into one of the accelerating cluster and the decelerating cluster based on the cluster center.

In an embodiment, an X-axis in the four axis of the 4D clustering model represents a CPU load, a Y-axis in the four axis of the 4D clustering model represents a memory utilization factor, a Z-axis in the four axis of the 4D clustering model represents a parallelizability factor and a W-axis in the four axis of the 4D clustering model represents the label data.

In an embodiment, the service is determined as critical for the boot-up process when one of the service initiates a predefined number of other services and the service is enabled or disabled in a notification panel of the electronic device, and where the service is determined as non-critical for the boot-up process when the service does not initiates a predefined number of other services.

Accordingly the embodiments herein provide a method for managing scheduling of services during a boot-up process in an electronic device including a multi-core processor. The method includes detecting the boot-up process at the electronic device. Further, the method includes determining services available in an accelerating cluster and services available in a decelerating cluster. Further, the method includes scheduling the services available in the accelerating cluster using at least one big core of the multi-core processor and the services available in the decelerating cluster using at least one small core of the multi-core processor during the boot-up process.

In an embodiment, the one of the accelerating cluster and the decelerating cluster is created by determining a plurality of services initiated during the boot-up processes of the electronic device, registering system parameters associated with the electronic device for each one of the determined services, determining whether the service is critical or non-critical for the boot-up process, tagging a label data to each one of the determined services, where the label data represents whether the service is critical or non-critical, feeding the registered system parameters associated with the electronic device and the tagged label data in to a 4D clustering model, creating a 4D map by plotting data points representing the services on four axis of the 4D clustering model based on the registered system parameters associated with the electronic device and the tagged label data, determining a cluster center when at least two data points are greater than a threshold, where the cluster center is shifted according to a distance between the data points and the cluster center, and clustering the data points representing the services into one of the accelerating cluster and the decelerating cluster based on the cluster center.

Accordingly the embodiments herein provide an electronic device for managing scheduling of services during a boot-up. The electronic device includes a memory, a multi-core processor and a scheduler. The scheduler is coupled to the memory and the processor. The scheduler is configured to determine a plurality of services initiated during the boot-up process of the electronic device. Further, the scheduler is configured to register system parameters associated with the electronic device for each one of the determined services. Further, the scheduler is configured to determine whether the service is critical or non-critical. Further, the scheduler is configured to tag a label data to each one of the determined services, where the label data represents whether the service is critical or non-critical for the boot-up process. Further, the scheduler is configured to cluster each of the services into one of an accelerating cluster and a decelerating cluster based on the registered system parameters associated with the electronic device and the tagged label data.

Accordingly the embodiments herein provide an electronic device for managing scheduling of services during a boot-up. The electronic device includes a memory, a multi-core processor and a scheduler. The scheduler is coupled to the memory and the processor. The scheduler is configured to detect the boot-up process at the electronic device. Further, the scheduler is configured to determine services available in an accelerating cluster and services available in a decelerating cluster. Further, the scheduler is configured to schedule the services available in the accelerating cluster using at least one big core of the multi-core processor and the services available in the decelerating cluster using at least one small core of the multi-core processor during the boot-up process.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

According to various embodiments of the present disclosure, by managing scheduling of services during a boot-up process in an electronic device, an optimized booting time can be provided.

BRIEF DESCRIPTION OF DRAWINGS

This method and system is illustrated in the accompanying drawings, throughout which like reference letters indicate corresponding parts in the various figures. The embodiments herein will be better understood from the following description with reference to the drawings, in which:

FIG. 10A illustrates an example scenario of clustering the services to one of the accelerating cluster and the decelerating cluster, according to an embodiment as disclosed herein;

FIG. 12 illustrates an example scenario of dynamically updating the services enabled/disabled in the notification panel to one of the accelerating cluster and the decelerating cluster during a subsequent boot-up process, according to an embodiment as disclosed herein.

BEST MODE FOR CARRYING OUT THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Figure 1:
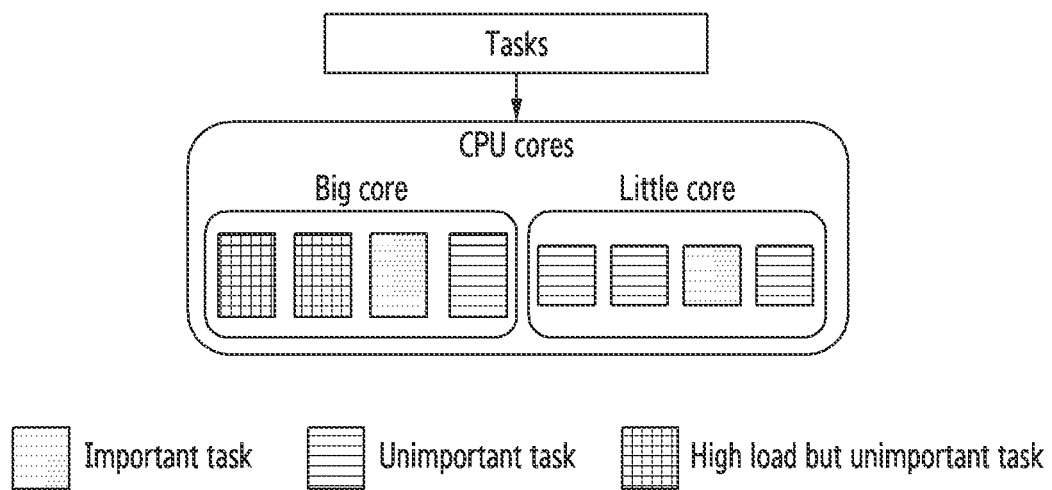
FIG. 1 is a schematic diagram illustrating an exemplary task scheduling system in an electronic device, according to a prior art.

During booting process, an exemplary task scheduling system in the electronic device assigns a task (e.g. process and services) with higher load to big cores (fast CPU) in a multi-core processor. Further, the task can also be scheduled to small cores (slow CPU) of the multi-core processor. FIG. 1 is a schematic diagram illustrating the exemplary task scheduling system in the electronic device. In the exemplary system, most of the tasks (same as services) are assigned to cores on the processor based on a load of the task on system resources (e.g., big core, small core etc.) to perform the task without taking into consideration an importance of the task. All services associated with the task that starts during the booting process gets randomly scheduled to the big cores or the small cores. An important task contains at least an important service, where other multiple services depend on the important services to operate. Therefore, if an important service running on the small cores causes to delay the operations of other multiple services, the booting time of the electronic device is further increased.

In the exemplary system, the services keep migrating from a big core to a small core then to the big core and so on during the booting process. This to and forth movement of the services between the big core and the small core causes to increase the booting time. Further, many new services get initiated upon installing new applications in the electronic device (e.g. smart phone, tablet computer etc.) which also causes to increase in the booting time. Changes in activation (e.g. turning on) of various services such as Wi-Fi, Bluetooth, GPS and the like, in the electronic device, also causes the electronic device to take more time to boot.

Thus, it is desired to address the above mentioned disadvantages or other shortcomings or at least provide a useful alternative for an optimized booting time.

Accordingly the embodiments herein provide a method for managing scheduling of services during a boot-up process in an electronic device including a multi-core processor. The method includes determining a plurality of services initiated during the boot-up process of the electronic device. Further, the method includes registering system parameters associated with the electronic device for each one of the determined services. Further, the method includes determining whether the service is critical or non-critical for the boot-up process. Further, the method includes tagging a label data to each one of the determined services, where the label data represents whether the service is critical or non-critical. Further, the method includes clustering each of the services into one of an accelerating cluster and a decelerating cluster based on the registered system parameters associated with the electronic device and the tagged label data.

Unlike to conventional methods and systems, the proposed method is used to differentiate the services which initiates during boot up process in the electronic device into the accelerating and decelerating clusters. The accelerating cluster represents a set of important services and the decelerating cluster represents a set of unimportant services. Further, more device resources (e.g. big core) are scheduled to the important services. Hence, the method provides optimization of the booting time of the electronic device, where other depending services of the important services will never get delayed to operate.

The proposed electronic device includes a 4D clustering model to generate a 4D map based on the registered system parameters and the labelled data. The electronic device remodels the 4D map in response to detecting that a new app is installed in the electronic device, where new services initiate upon the installation. The electronic device also remodels the 4D map in response to detecting an activation/deactivation of the services such as Wi-Fi, Bluetooth, GPS, night mode, power saving mode and the like, in the electronic device, where the new services initiate upon the activation/deactivation. Further, the electronic device estimates whether the new services deteriorate the booting time upon clustering the new services to the accelerating cluster. In response to detecting that clustering of the new services to the accelerating cluster deteriorates the booting time, the electronic device dynamically cluster the new services to the decelerating cluster for an optimized booting time. So that, the device resources keep available for the important services to operate without any scarcity. Thus, the electronic device adaptively clusters the services to optimize the booting time.

Unlike conventional methods and systems, the power consumption of the proposed electronic device is less due to the optimization in the booting time, where the power source is used for a less amount of time with respect to that of the exemplary system.

Referring now to the drawings, and more particularly to FIGS. 2 through 13, there are shown preferred embodiments.

Figure 2:
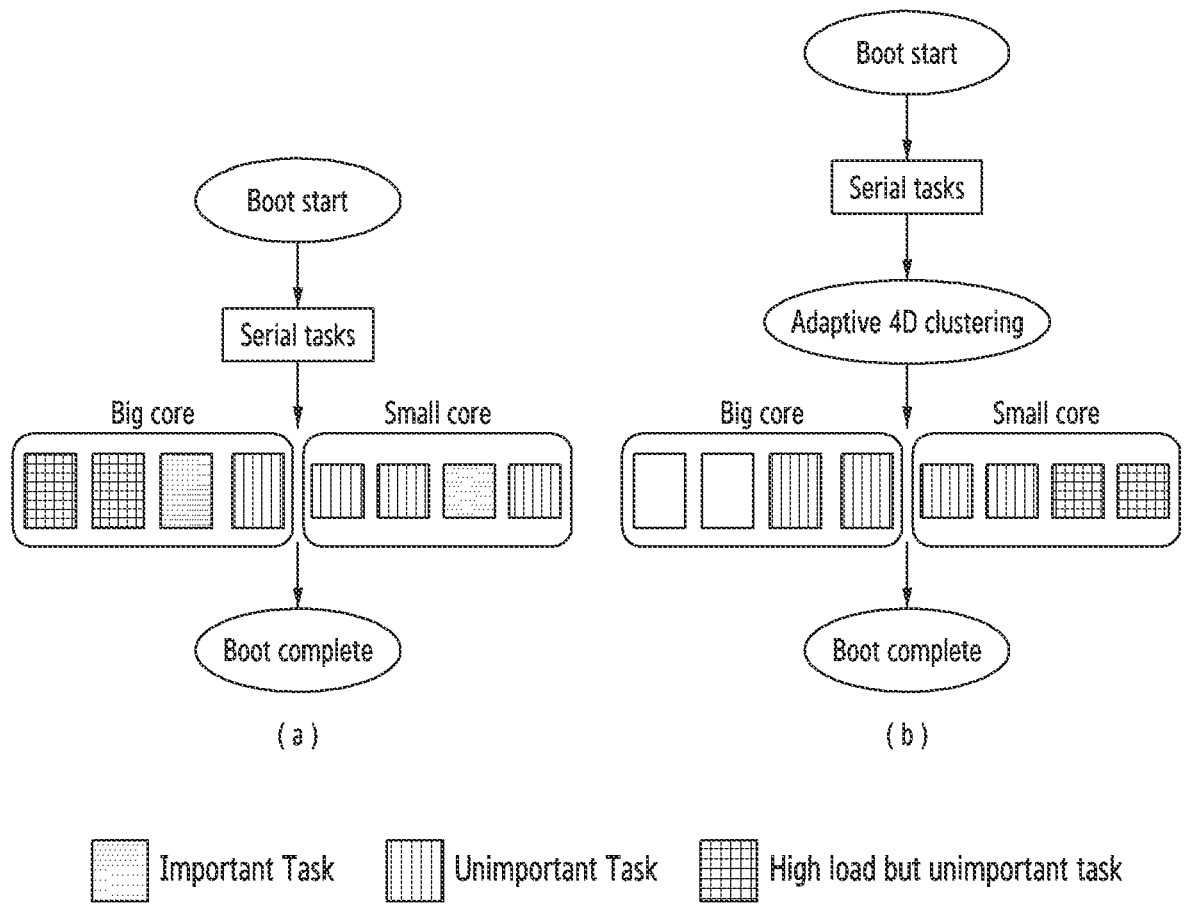
FIG. 2 illustrates a comparison of an exemplary method to proposed method for scheduling services during a boot-up process in the electronic device, according to an embodiment as disclosed herein.

FIG. 2 illustrates a comparison of an exemplary method to the proposed method for scheduling services during a boot-up process in an electronic device, according to an embodiment as disclosed herein. In the exemplary method, as shown in notation '(a)' of the FIG. 2, upon initiating the boot-up process in the electronic device (not shown in the FIG. 2), serial tasks (same as services) are scheduled to cores on a multi-core processor of the electronic device. The serial tasks are scheduled to the cores based on a load of the serial task on system resources (e.g., big core, small core etc.) to perform the serial task, but not based on an importance of the serial task. Therefore, an important serial task may run on the small cores, as the electronic device needs more time to complete the boot-up process. While parallel threads are running, the important tasks keep migrating from the big core to the small core then to the big core and so on (called as CPU migration) which creates an overhead during the boot-up process.

According to the proposed method, as shown in notation '(b)' of the FIG. 2, upon starting the boot-up process in the electronic device, the electronic device identifies a plurality of tasks initiated during the boot-up process. Further, the electronic device registers system parameters associated with the electronic device for each one of the determined tasks. In an embodiment, the system parameters associated with the electronic device includes a Central Processing Unit (CPU) load, a parallelizability factor, and a memory utilization factor.

The CPU load is a maximum load on the CPU for initiating the service during boot-up process. In an embodiment, the CPU load estimates using a CPU frequency and Graphics Processing Unit (GPU) frequency. The parallelizability factor varies as if the services have more than one child service. The memory utilization factor is the maximum memory taken by the service during the boot-up process. In an example, the CPU load on a value of the CPU load is 0.9% for the systemserver service and 1.7% nfc service. In an example, the parallelizability factor or a value of the parallelizability factor is 1 for systemserver service, 0 for nfc service. In an example, the memory utilization factor or a value of the memory utilization factor is 25,252K for systemserver service, 20,779K for nfc service.

Further, the electronic device determines whether the task is critical or non-critical for the boot-up process. In an embodiment, the service is determined as critical for the boot-up process when the service initiates a predefined number of other services.

In an embodiment, the service is determined as critical for the boot-up process when the service is enabled or disabled in the notification panel of the electronic device. In an embodiment, the critical service includes the service selected by a user. The electronic device detects the services selected by the user based on a user usage pattern. The services such as Wi-Fi, Bluetooth, night mode and power saving mode and the like, in the notification panel of the electronic device needs to start really fast for the user to use it exactly when the boot-up process completes. The boot-up process is considered to be complete when a home screen shows. In an example, a Parent Process Identifier (PPID) label data of the service is one, if the user selects the service form the notification panel, indicates that the service is critical.

In an embodiment, the service is determined as non-critical for the boot-up process when the service does not initiates the predefined number of other services.

Further, the electronic device tags a label data to each one of the determined tasks, where the label data represents whether the task is critical or non-critical. The label data indicates that the services/tasks which are really critical for better boot performance. In an embodiment, the electronic device counts a (PPID) of the services to determine the label data of the service. In an example, the label data is the services which are parent service to as many as 10 child services. In an example, the label data is the service that starts more than 10 other services. In an example, INIT service starts many other service (called as daemons) that are visible in the kernel logs: bootanim, powersnd, ccm etc. The other critical services which starts more than 10 services such as system_server, zygote64, application_manager_service, etc. Kernel logs are given in Table 1.

TABLE 1

| Kernel logs | kernel logs |
|---|---|
| 4.963880] | init: starting service 'bootanim' . . . |
| 4.971268] | init: starting service 'powersnd' . . . |
| 9.258477] | init: starting service 'ccm' . . . |
| 9.267401] | init: starting service 'esecomm' . . . |
| 9.817544] | init: starting service 'otp' . . . |
| 11.035808] | init: starting service 'webview_zygote32' . . . |
| 11.614509] | init: starting service 'wpa_supplicant' . . . |
| 14.044040] | init: starting service 'iod' . . . |
| 14.045025] | init: starting service 'bsd' . . . |
| 14.045927] | init: starting service 'sem daemon' . . . |

TABLE 1-continued

| Kernel logs | kernel logs |
|---|---|
| 14.047044] | init: starting service 'exec 4 (/system/bin/bootstat)' . . . |
| 14.071722] | init: starting service 'exec 5 (/system/bin/bootstat)' . . . |
| 14.079418] | init: starting service 'exec 6 (/system/bin/bootstat)' . . . |
| 14.091432] | init: starting service 'exec 7 (/system/bin/bootstat)' . . . |

In an embodiment, the electronic device counts a (PPID) of the services to determine the label data of the service. In an example, the label data of the service is 1, if the PPID count of the service is greater than 10. The label data of the service is 0, if the PPID count of the service is not greater than 10.

In an example, the service is critical, a value of the label data of the service is one. The service is non-critical, if the value of the label data of the service is zero. The critical services are preferred to cluster in an accelerating cluster, which improves the booting time of the electronic device.

The electronic device clusters the tasks to one of the accelerating cluster and a decelerating cluster by applying the adaptive four 4D clustering on the tasks. The adaptive 4D clustering includes feeding the registered system parameters associated with the electronic device and the tagged label data in to a 4D clustering model. The 4D clustering model includes an X-axis, a Y-axis, a Z-axis and a W-axis. In an embodiment, the X-axis represents the CPU load, the Y-axis represents the memory utilization factor, the Z-axis represents the parallelizability factor and the W-axis represents the label data. In an embodiment, the representation of the label data and each of the system parameters interchanges between the X-axis, the Y-axis, the Z-axis and the W-axis.

Further, the adaptive 4D clustering includes creating a 4D map by plotting data points representing the services on four axis of the 4D clustering model based on the registered system parameters associated with the electronic device and the tagged label data. In an embodiment, the registered system parameters and the tagged label data of each service are the data points of the service.

Further, the adaptive 4D clustering includes determining a cluster center when at least two data points are greater than a threshold, where the cluster center is shifted according to a distance between the data points and the cluster center. Let 'a' is one service with data points {a1, a2, a3, a4} and 'b' is the cluster center {b1, b2, b3, b4}. Distance between the data points a1 and cluster center $b_j$ is shown in Equation 1:

$$d(a,b) = \sqrt{((a1-b1)^2 + (a2-b2)^2 + (a3-b3)^2 + (a4-b4)^2)} \quad (1)$$

Equation 1

Equation 2 represents a final 4D clustering expression:

$$J(V) = \Sigma_{i=1}^{2} \Sigma_{j=1}^{Ci} (d(a,b))^2 \quad (2)$$

Equation 2

'ci' is the number of data points in ith cluster. '2' is the number of cluster centers.

Further, the adaptive 4D clustering includes clustering the data points representing the services into one of the accelerating cluster and the decelerating cluster based on the cluster center.

In an embodiment, all the serial tasks and important/critical tasks are clustered to accelerating cluster. In an embodiment, all parallel tasks are clustered to one of the accelerating cluster and the decelerating cluster by applying the adaptive 4D clustering. Therefore, the CPU migration is restricted from the next boot-up process. The big cores of the multi-core processor of the electronic device are scheduled for the services in the accelerating cluster. The small cores of the multi-core processor of the electronic device are scheduled for the services in the decelerating cluster. Hence, from the sub-sequent booting onwards an optimization in booting time is achieved.

Figure 3:
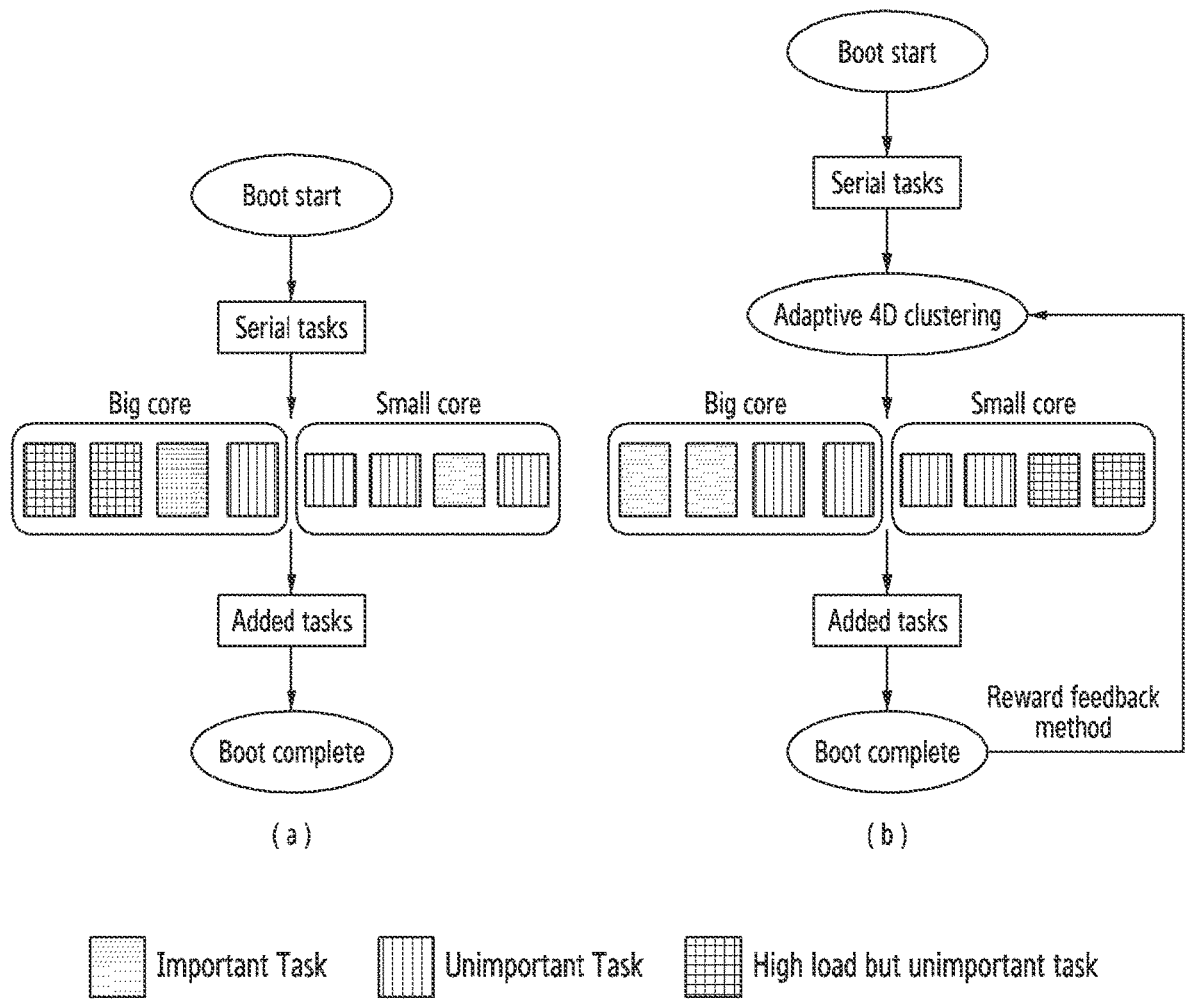
FIG. 3 illustrates a comparison of an exemplary method to the proposed method for scheduling new services during the boot-up process in the electronic device, according to an embodiment as disclosed herein.

FIG. 3 illustrates a comparison of an exemplary method to the proposed method for scheduling new services during the boot-up process in the electronic device, according to an embodiment as disclosed herein. In the exemplary method, as shown in notation '(a)' of the FIG. 3, upon installing new applications in the electronic device, many new services (same as tasks) are added to initiate during the boot-up process. When the user enables/disables the services (e.g., Wi-Fi, Bluetooth, GPS etc.) in the notification panel of the electronic device (e.g. smart phone, tablet computer etc.), lot of new services are updated to initiate for the boot-up process. The electronic device needs more time for completing the boot-up process by initiating the new services.

According to the proposed method, as shown in notation '(b)' of the FIG. 3, the new services are dynamically updated to one of the accelerating cluster and the decelerating cluster by applying the adaptive 4D clustering method and a reward feedback method. In response to detecting that the new services have to initiate by the electronic device during the next boot-up process, the electronic device applies the reward feedback method on the new services. The reward feedback method is used by the electronic device to estimate whether clustering of each new services to the accelerating cluster deteriorates the booting time of the electronic device.

In an embodiment, the electronic device estimates the booting time of the next boot-up process, upon clustering the new services to the accelerating cluster. In response to detecting that the booting time is optimized for the next boot-up process, the electronic device provides a positive reward point (a numerical value) for the new service. Further, the electronic device clusters the new service to the accelerating cluster for the sub-sequent boot-up process. In response to detecting that the booting time is not optimized for the next boot-up process, the electronic device provides a negative reward point (a numerical value) for the new service. Further, the electronic device clusters the new service to the decelerating cluster for sub-sequent boot-up process.

In an embodiment, upon detecting that the booting time of the electronic device does not deteriorates due to the clustering the new services to the accelerating cluster, the detected new services are clustered to the accelerating cluster by applying the adaptive 4D clustering method. Upon detecting that the booting time of the electronic device deteriorates due to clustering the new services to the accelerating cluster, the detected new services are clustered to the decelerating cluster by applying the adaptive 4D clustering method. In an example, when the estimated booting time for the new service is within a threshold time, then the positive reward point is given to the new service, else the negative reward point is given to the new service. Hence, from the sub-sequent booting onwards the optimization in booting time can be achieved.

Figure 4A:
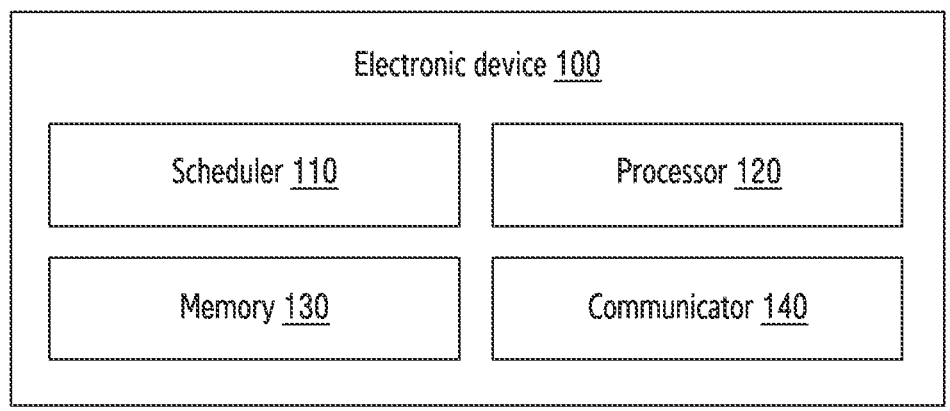
FIG. 4A is a block diagram illustrating various hardware components of an electronic device for managing scheduling of the services during the boot-up process in the electronic device, according to an embodiment as disclosed herein.

FIG. 4A is a block diagram illustrating various hardware components of the electronic device 100 for managing scheduling of the services during the boot-up process in the electronic device 100, according to an embodiment as disclosed herein. Examples for the electronic device 100 is, but not limited to a smart phone, a tablet computer, a personal computer, a desktop computer, a mobile device, a personal digital assistance (PDA), a multimedia device, an Internet of Things (IoT) or the like. In an embodiment, the electronic device 100 includes a scheduler 110, a processor 120, a memory 130 and a communicator 140. In an embodiment, the processor 120 is a multi-core processor includes the big cores and the small cores. The processor 120 is configured to execute instructions stored in the memory 130 and to perform various operations. The scheduler 110 is coupled to the memory 130 and the processor 120. The scheduler 110 is configured to determine the plurality of services initiated during the boot-up process of the electronic device 100. Further, the scheduler 110 is configured to register system parameters associated with the electronic device 100 for each one of the determined services. In an embodiment, the scheduler 110 is configured to record the PPID for all the determined services. Further, the scheduler 110 is configured to determine whether the service is critical or non-critical. Further, the scheduler 110 is configured to tag the label data to each one of the determined services, where the label data represents whether the service is critical or non-critical for the boot-up process.

In an embodiment, the scheduler 110 is configured to count the PPID count of the services for tagging the label data for the services and to determine whether the count of the PPID is greater than a threshold value (e.g. 10). The scheduler 110 is configured to set the value of the label data as zero, in response to determining that the count of the PPID is not greater than the threshold value. The scheduler 110 is configured to set the value of the label data as one, in response to determining that the count of the PPID is greater than the threshold value.

The scheduler 110 is configured to cluster each of the services into one of the accelerating cluster and the decelerating cluster based on the registered system parameters associated with the electronic device 100 and the tagged label data.

In an embodiment, each of the services is clustered into one of the accelerating cluster and the decelerating cluster by feeding the registered system parameters associated with the electronic device 100 and the tagged label data in to the 4D clustering model, creating the 4D map by plotting the data points representing the services on four axis of the 4D clustering model based on the registered system parameters associated with the electronic device 100 and the tagged label data, determining the cluster center when at least two data points are greater than the threshold, where the cluster center is shifted according to the distance between the data points and the cluster center and clustering the data points representing the services into one of the accelerating cluster and the decelerating cluster based on the cluster center.

Further, the scheduler 110 is configured to detect the subsequent boot-up process at the electronic device 100. Further, the scheduler 110 is configured to determine the services available in the accelerating cluster and the services available in the decelerating cluster. Further, the scheduler 110 is configured to schedule the services available in the accelerating cluster using at least one big core and the services available in the decelerating cluster using at least one small core during the subsequent boot-up process.

In another embodiment, the scheduler 110 is configured to detect the enabling/disabling of the services in the notification panel. In an embodiment, the scheduler 110 is configured to detect the user selection on services in the notification panel based on the user usage pattern. In an embodiment, the scheduler 110 is configured to detect the new services to be initiate due to the installation of the new applications in the electronic device 100. Further, the scheduler 110 is configured to include the detected services to initiate during the sub-sequent boot-up process of the electronic device 100.

Further, the scheduler 110 is configured to determine the plurality of new services initiated during the subsequent boot-up process of the electronic device 100. Further, the scheduler 110 is configured to register system parameters associated with the electronic device 100 for each one of the determined new services during the subsequent boot-up process. In an embodiment, the scheduler 110 is configured to record the user input of enabling/disabling of the service at the notification panel. Further, the scheduler 110 is configured to recording the PPID of the service. Further, the scheduler 110 is configured to update the PPID label data as one for the service, in response to detecting the enabling/disabling of the service in the notification panel.

The scheduler 110 is configured to tag the label data to each one of the determined new services during the subsequent boot-up process as critical or non-critical. Further, the scheduler 110 is configured to dynamically update the determined new services during the subsequent boot-up process in one of the accelerating cluster and the decelerating cluster based on the system parameters associated with the electronic device 100 for each one of the determined new services and the tagged label data during the subsequent boot-up process.

In an embodiment, the scheduler 110 is configured to generate a value matrix includes all kind of identified services, the values of the corresponding registered system parameters of the services, a value of the label data of the service and a cluster value. In an example, the value of the label data of the service is 0 or 1. In an example, the cluster value the service is 1 or 2, where 1 represents the acceleration cluster and 2 represents the deceleration cluster.

The memory 130 stores instructions to be executed by the processor 120. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory 130. In certain examples, a non-transitory storage medium may store data that can, over time, change (e.g., in Random Access Memory (RAM) or cache).

The communicator 140 is configured to communicate internally between hardware components in the electronic device 100.

Although the FIG. 4A shows the hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the invention. One or more components can be combined together to perform same or substantially similar function for managing scheduling of the services during the boot-up process.

Figure 4B:
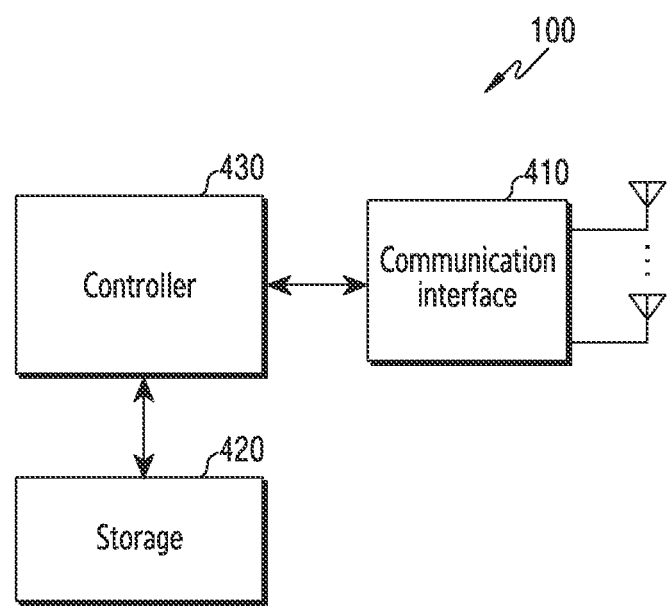
FIG. 4B is another block diagram illustrating various hardware components of an electronic device for managing scheduling of the services during the boot-up process in the electronic device, according to an embodiment as disclosed herein.

FIG. 4B is another block diagram illustrating various hardware components of an electronic device for managing scheduling of the services during the boot-up process in the electronic device, according to an embodiment as disclosed herein. A structure exemplified at FIG. 4B may be understood as a structure of the electronic device 100. The term "-module", "-unit" or "-er" used hereinafter may refer to the unit for processing at least one function or operation, and may be implemented in hardware, software, or a combination of hardware and software.

Referring to FIG. 4B, the electronic device 100 includes a communication interface 410, a storage unit 420, and a controller 430.

The communication interface 410 performs functions for transmitting/receiving a signal through a wireless channel. For example, the communication interface 410 performs a function of conversion between a baseband signal and bitstreams according to the physical layer standard of the system. For example, in data transmission, the communication interface 410 generates complex symbols by encoding and modulating transmission bitstreams. Also, in data reception, the communication interface 410 reconstructs reception bitstreams by demodulating and decoding the baseband signal. In addition, the communication interface 410 up-converts the baseband signal into an RF band signal, transmits the converted signal through an antenna, and then down-converts the RF band signal received through the antenna into the baseband signal. For example, the communication interface 410 may include a transmission filter, a reception filter, an amplifier, a mixer, an oscillator, a DAC, and an ADC.

Further, the communication interface 410 may include a plurality of transmission/reception paths. In addition, the communication interface 410 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 410 may include a plurality of RF chains. The communication interface 410 may perform beamforming.

The communication interface 410 transmits and receives the signal as described above. Accordingly, the communication interface 410 may be referred to as a "transmitter," a "receiver," or a "transceiver." Further, in the following description, transmission and reception performed through the wireless channel is used to have a meaning including the processing performed by the communication interface 410 as described above. According to various embodiments, the communication interface 410 may comprise the communicator 140.

The storage unit 420 stores a basic program, an application, and data such as setting information for the operation of the electronic device 100. The storage unit 420 may include a volatile memory, a non-volatile memory, or a combination of volatile memory and non-volatile memory. Further, the storage unit 420 provides stored data in response to a request from the controller 430. According to various embodiments, the storage unit 420 may comprise the memory 130.

The controller 430 controls the general operation of the electronic device 100. For example, the controller 430 transmits and receives a signal through the communication interface 410. Further, the controller 430 records data in the storage unit 420 and reads the recorded data. The controller 430 may performs functions of a protocol stack that is required from a communication standard. According to another implementation, the protocol stack may be included in the communication interface 410. To this end, the controller 430 may include at least one processor or microprocessor, or may play the part of the processor. Further, the part of the communication interface 410 or the controller 430 may be referred to as a communication processor (CP). According to various embodiments, the controller 430 may comprise scheduler 110 and/or processor 120.

According to exemplary embodiments of the present disclosure, the controller 430 may determine a plurality of services initiated during the boot-up process of the electronic device, register system parameters associated with the electronic device for each of the plurality of services, determine a criticality of each of the plurality of services for the boot-up process, wherein the criticality indicates whether each of the plurality of services is critical or non-critical for the boot-up process, tag label data to each of the services, wherein the label data represents whether each of the plurality of services is critical or non-critical, and cluster each of the services into an accelerating cluster or a decelerating cluster based on the registered system parameters associated with the electronic device for each of the plurality of services and the tagged label data to each of the plurality of services. For example, the controller 430 may control the electronic device to perform operations according to the exemplary embodiments of the present disclosure.

Figure 5:
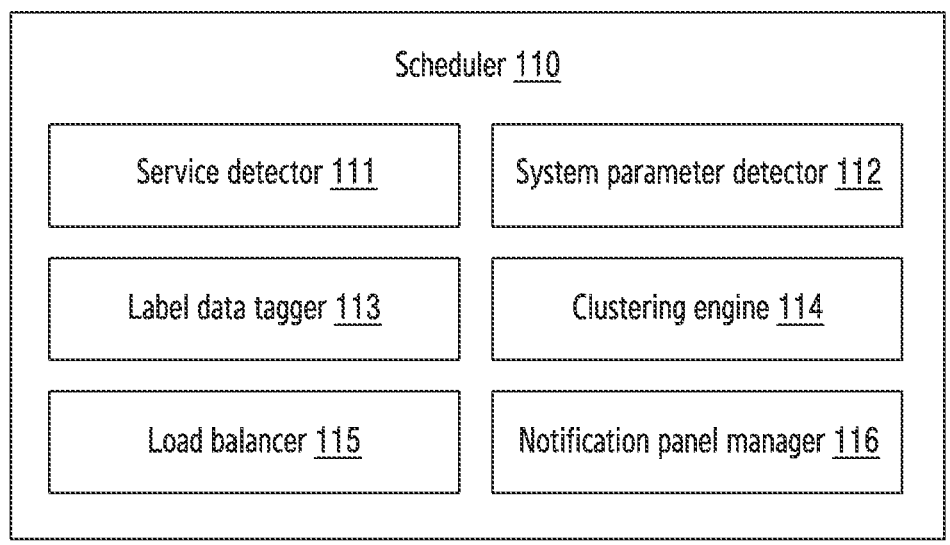
FIG. 5 is a block diagram illustrating various hardware components of a scheduler, according to an embodiment as disclosed herein.

FIG. 5 is a block diagram illustrating various hardware components of the scheduler 110, according to an embodiment as disclosed herein. In an embodiment, the scheduler 110 includes a service detector 111, a system parameter detector 112, a label data tagger 113, a clustering engine 114, a load balancer 115 and a notification panel manager 116. The service detector 111 determines the plurality of services initiated during the boot-up process of the electronic device 100. The service detector 111 determines whether the service is critical or non-critical for the boot-up process. The service detector 111 detects the subsequent boot-up process at the electronic device 100. The service detector 111 determines the services available in the accelerating cluster and the services available in the decelerating cluster. The service detector 111 determines the plurality of new services initiated during the subsequent boot-up process of the electronic device 100.

The system parameter detector 112 registers the system parameters associated with the electronic device 100 for each one of the determined services. The system parameter detector 112 registers the system parameters associated with the electronic device 100 for each one of the determined new services during the subsequent boot-up process. In an embodiment, the system parameter detector 112 records the PPID for all the services.

The label data tagger 113 tags the label data to each one of the determined services. The label data tagger 113 tags the label data to each one of the determined new services during the subsequent boot-up process as critical or non-critical. In an embodiment, the label data tagger 113 determines whether the count of the PPID is greater than the threshold value (e.g., 10). In an embodiment, the label data tagger 113 sets the value of the label data as zero, in response to determining that the count of the PPID is not greater than the threshold value. In an embodiment, the label data tagger 113 sets the value of the label data as one, in response to determining that the count of the PPID is greater than the threshold value. In an embodiment, the label data tagger 113 to update the PPID label data as one for the service, in response to detecting the enabling/disabling of the service in the notification panel.

The clustering engine 114 clusters each of the services into one of the accelerating cluster and the decelerating cluster based on the registered system parameters associated with the electronic device 100 and the tagged label data. The clustering engine 114 dynamically updates the determined new services during the subsequent boot-up process in one of the accelerating cluster and the decelerating cluster based on the system parameters associated with the electronic device 100 for each one of the determined new services and the tagged label data during the subsequent boot-up process.

The load balancer 115 schedules the services available in the accelerating cluster using at least one big core and the services available in the decelerating cluster using at least one small core during the subsequent boot-up process.

The notification panel manager 116 detects the enabling/disabling of the services in the notification panel. In an embodiment, the notification panel manager 116 records the user input of enabling/disabling of the service at the notification panel. The notification panel manager 116 detects the new services to be initiate due to the installation of the new applications in the electronic device 100. Further, the notification panel manager 116 provides the detected services/new services to the clustering engine 11. Further, the clustering engine 11 dynamically updates the determined services/new services to one of the accelerating cluster and the decelerating cluster for the subsequent boot-up process, by using the reward feedback method.

Although the FIG. 5 shows the hardware components of the scheduler 110 but it is to be understood that other embodiments are not limited thereon. In other embodiments, the scheduler 110 may include less or more number of components. Further, the labels or names of the components are used only for illustrative purpose and does not limit the scope of the invention. One or more components can be combined together to perform same or substantially similar function for managing scheduling of the services during the boot-up process.

Figure 6:
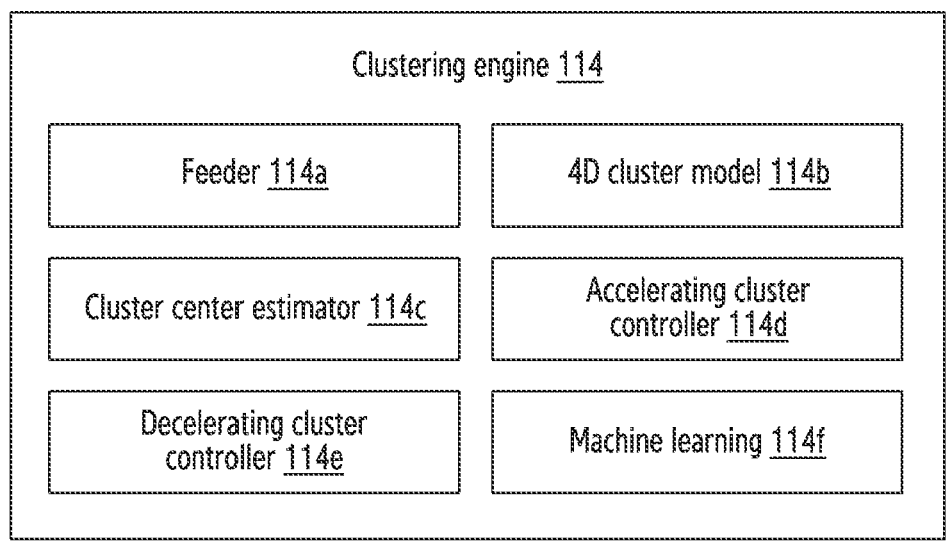
FIG. 6 is a block diagram illustrating various hardware components a clustering engine, according to an embodiment as disclosed herein.

FIG. 6 is a block diagram illustrating various hardware components the clustering engine 114, according to an embodiment as disclosed herein. In an embodiment, the clustering engine 114 includes a feeder 114a, a 4D cluster model 114b, a cluster center estimator 114c, an accelerating cluster controller 114d, a decelerating cluster controller 114e, and machine learning 114f. The feeder 114a feeds the registered system parameters associated with the electronic device 100 and the tagged label data in to the 4D clustering model. The 4D cluster model 114b creates the 4D map by plotting the data points representing the services on four axis of the 4D clustering model based on the registered system parameters associated with the electronic device 100 and the tagged label data. The cluster center estimator 114c determine the cluster center when at least two data points are greater than the threshold, where the cluster center is shifted according to the distance between the data points and the cluster center. The accelerating cluster controller 114d cluster the data points representing the services into the accelerating cluster. The decelerating cluster controller 114e clusters the data points representing the services into the decelerating cluster.

The machine learning 114f dynamically updates the determined services/new services during the subsequent boot-up process in one of the accelerating cluster and the decelerating cluster by using the reward feedback method. In an embodiment, the machine learning 114f dynamically remodel the cluster for next boot, in response to detecting the new services are added to initiate during the sub-sequent boot-up process. The machine learning 114f estimates the booting time of the next boot-up process, upon clustering the new services to the accelerating cluster. In response to detecting that the booting time is optimized for the next boot-up process, the machine learning 114f provides the positive reward point (a numerical value) for the new service. In response to detecting that the booting time is not optimized for the next boot-up process, the machine learning 114f provides the negative reward point (a numerical value) for the new service. Based on the positive reward point/negative reward point, the clustering engine 114 remodels the 4D map for the new services.

Although the FIG. 6 shows the hardware components of the clustering engine 114 but it is to be understood that other embodiments are not limited thereon. In other embodiments, the clustering engine 114 may include less or more number of components. Further, the labels or names of the components are used only for illustrative purpose and does not limit the scope of the invention. One or more components can be combined together to perform same or substantially similar function for clustering the services into one of the accelerating cluster and the decelerating cluster.

Figure 7A:
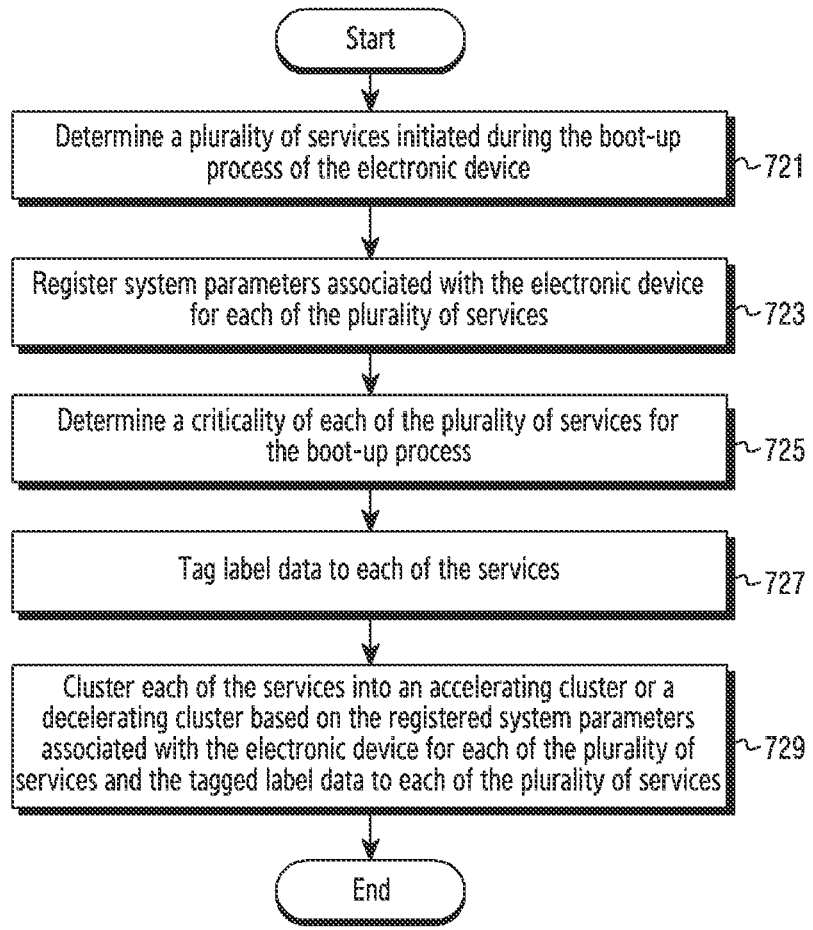
FIG. 7A is a flow diagram illustrating a method for clustering services during a boot-up process in the electronic device, according to an embodiment as disclosed herein.

FIG. 7A is a flow diagram illustrating a method for clustering services during a boot-up process in the electronic device, according to an embodiment as disclosed herein. FIG. 7A illustrates operations performed by the electronic device 100.

Referring to FIG. 7A, at operation 721, the electronic device may determine a plurality of services initiated during the boot-up process of the electronic device. For example, the controller 430 may determine a plurality of services initiated during the boot-up process of the electronic device.

At operation 723, the electronic device may register system parameters associated with the electronic device for each of the plurality of services. For example, the controller 430 may register system parameters associated with the electronic device for each of the plurality of services. The system parameters associated with the electronic device comprises at least one of a central processing unit (CPU) load, a parallelizability factor, or a memory utilization factor.

At operation 725, the electronic device may determine a criticality of each of the plurality of services for the boot-up process. For example, the controller 330 may determine a criticality of each of the plurality of services for the boot-up process. According to various embodiments, the criticality may indicate whether each of the plurality of services is critical or non-critical for the boot-up process. For example, a service of the plurality of services is determined as critical for the boot-up process if the service initiates a predefined number of other services, or the service is enabled or disabled in a notification panel of the electronic device, and the service is determined as non-critical for the boot-up process if the service does not initiates a predefined number of other services.

At operation 727, the electronic device may tag label data to each of the services. For example, the controller 330 may tag label data to each of the services. According to various embodiments, the label data represents whether each of the plurality of services is critical or non-critical.

At operation 729, the electronic device may cluster each of the services into an accelerating cluster or a decelerating cluster based on the registered system parameters associated with the electronic device for each of the plurality of services and the tagged label data to each of the plurality of services. For example, the controller 330 may cluster each of the services into an accelerating cluster or a decelerating cluster based on the registered system parameters associated with the electronic device for each of the plurality of services and the tagged label data to each of the plurality of services. According to various embodiments, the controller 330 may feed the registered system parameters associated with the electronic device for each of the plurality of services and the tagged label data to each of the plurality of services into a four dimensional (4D) clustering model, create a 4D map by plotting data points representing the plurality of services on four axis of the 4D clustering model based on the registered system parameters associated with the electronic device for each of the plurality of services and the tagged label data to each of the plurality of services, determine a cluster center if at least two data points are greater than a threshold, wherein the cluster center is determined based on a distance between the data points and the cluster center, and cluster the data points representing the plurality of services into the accelerating cluster or the decelerating cluster based on the cluster center. According to various embodiments, a first axis of the 4D clustering model represents a central processing unit (CPU) load, a second axis of the 4D clustering model represents a memory utilization factor, a third axis of the 4D clustering model represents a parallelizability factor, and a fifth axis of the 4D clustering model represents the label data.

Though not illustrated, the electronic device may (for example, the controller 330 may be further configured to) detect a subsequent boot-up process in the electronic device, determine first services available in the accelerating cluster and second services available in the decelerating cluster, and schedule, during the subsequent boot-up process, the first services based on at least one big core of the multi-core processor and the second services based on at least one small core of the multi-core processor.

Though not illustrated, the electronic device may (for example, the controller 330 may be further configured to) determine a plurality of new services initiated during the subsequent boot-up process of the electronic device, register system parameters associated with the electronic device for each of the plurality of new services during the subsequent boot-up process, tag label data to each of the plurality of new services during the subsequent boot-up process based on a criticality of each of the plurality of new services, and dynamically update each of the plurality of new services during the subsequent boot-up process in the accelerating cluster or the decelerating cluster based on the system parameters associated with the electronic device for each of the plurality of new services and the tagged label data to each of the plurality of new services.

Figure 7B:
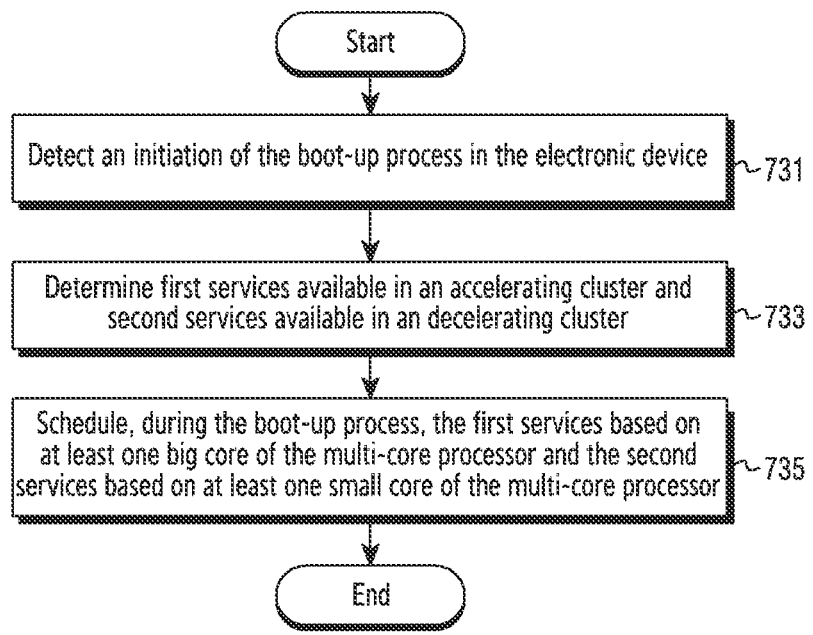
FIG. 7B is a flow diagram illustrating a method for scheduling services in different clusters during the boot-up process in the electronic device, according to an embodiment as disclosed herein.

FIG. 7B is a flow diagram illustrating a method for scheduling services in different clusters during the boot-up process in the electronic device, according to an embodiment as disclosed herein. FIG. 7B illustrates operations performed by the electronic device 100.

Referring to FIG. 7B, at operation 731, the electronic device may detect an initiation of the boot-up process in the electronic device. For example, the controller 403 may detect an initiation of the boot-up process in the electronic device.

At operation 733, the electronic device may determine first services available in an accelerating cluster and second services available in an decelerating cluster. For example, the controller 430 may determine first services available in an accelerating cluster and second services available in an decelerating cluster.

At operation 735, the electronic device may schedule, during the boot-up process, the first services based on at least one big core of the multi-core processor and the second services based on at least one small core of the multi-core processor. For example, the controller 430 may schedule, during the boot-up process, the first services based on at least one big core of the multi-core processor and the second services based on at least one small core of the multi-core processor.

Though not illustrated, the electronic device may (or, the controller 430 may be further configured to) determine a plurality of services initiated during the boot-up processes of the electronic device, wherein the plurality of services comprise the first services and the second services, register system parameters associated with the electronic device for each of the plurality of services, determine a criticality of each of the plurality of services for the boot-up process, wherein the criticality indicates whether each of the plurality of services is critical or non-critical for the boot-up process, tag label data to each of the services, wherein the label data represents whether each of the plurality of services is critical or non-critical, feed the registered system parameters associated with the electronic device for each of the plurality of services and the tagged label data to each of the plurality of services into a four dimensional (4D) clustering model, create a 4D map by plotting data points representing the plurality of services on four axis of the 4D clustering model based on the registered system parameters associated with the electronic device for each of the plurality of services and the tagged label data to each of the plurality of services, determine a cluster center if at least two data points are greater than a threshold, wherein the cluster center is determined based on a distance between the data points and the cluster center, and cluster the data points representing the plurality of services into the accelerating cluster or the decelerating cluster based on the cluster center. According to various embodiments, a first axis of the 4D clustering model represents a central processing unit (CPU) load, a second axis of the 4D clustering model represents a memory utilization factor, a third axis of the 4D clustering model represents a parallelizability factor, and a fifth axis of the 4D clustering model represents the label data. According to various embodiments, the system parameters associated with the electronic device comprises at least one of a central processing unit (CPU) load, a parallelizability factor, or a memory utilization factor. According to various embodiments, a service of the plurality of services is determined as critical for the boot-up process if the service initiates a predefined number of other services, or the service is enabled or disabled in a notification panel of the electronic device, and wherein the service is determined as non-critical for the boot-up process if the service does not initiates a predefined number of other services.

Though not illustrated, the electronic device may (or, the controller 430 may be further configured to) determine a plurality of new services initiated during the subsequent boot-up process of the electronic device, register system parameters associated with the electronic device for each of the plurality of new services during the subsequent boot-up process, tag label data to each of the plurality of new services during the subsequent boot-up process based on a criticality of each of the plurality of new services, and dynamically update each of the plurality of new services during the subsequent boot-up process in the accelerating cluster or the decelerating cluster based on the system parameters associated with the electronic device for each of the plurality of new services and the tagged label data to each of the plurality of new services.

Figure 7C:
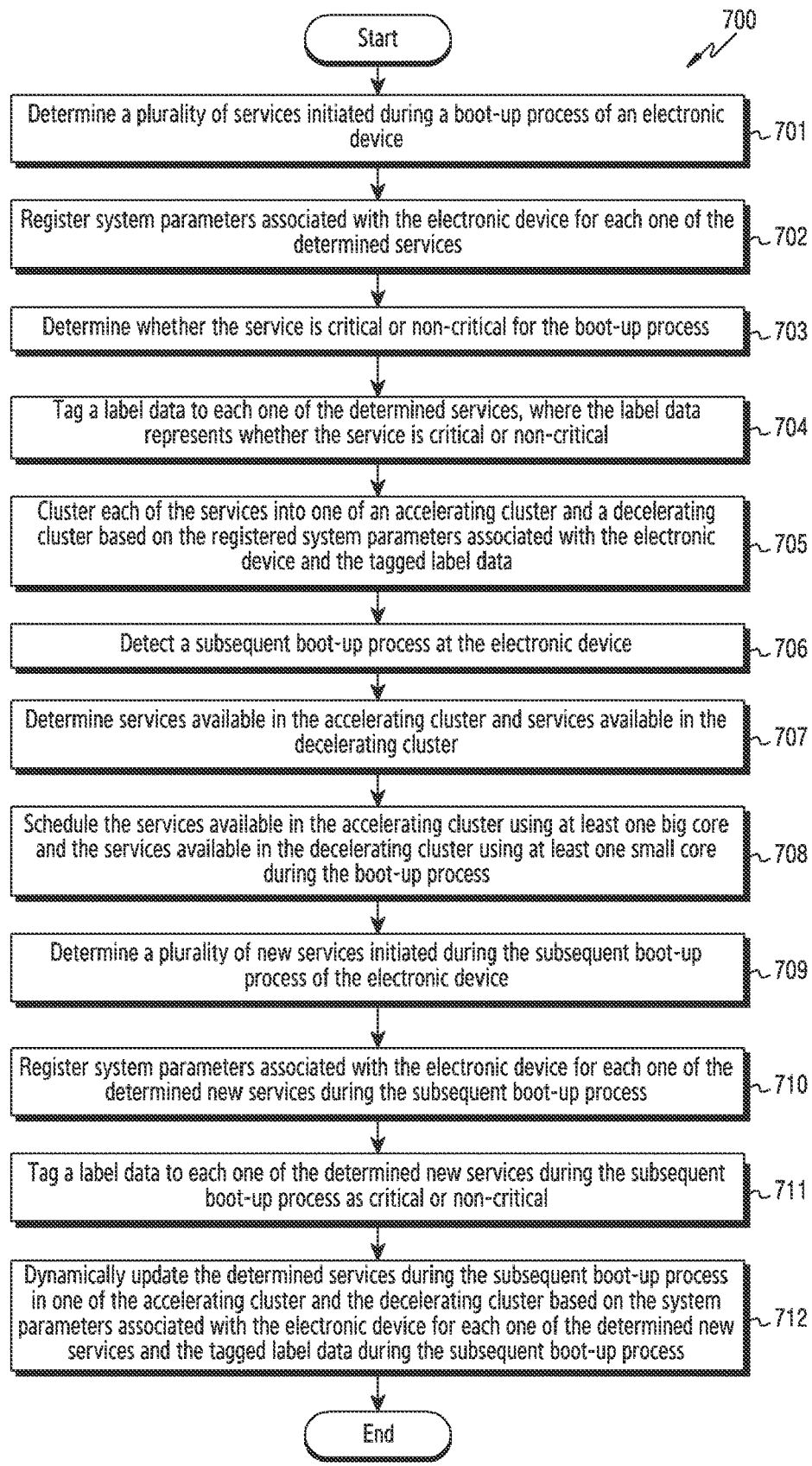
FIG. 7C is a flow diagram illustrating a method for managing scheduling of the services during the boot-up process in the electronic device, according to an embodiment as disclosed herein.

FIG. 7C is a flow diagram 700 illustrating a method for managing scheduling of the services during the boot-up process in the electronic device 100, according to an embodiment as disclosed herein. At 701, the method includes determining the plurality of services initiated during the boot-up process of the electronic device 100. In an embodiment, the method allows the service detector 111 to determining the plurality of services initiated during the boot-up process of the electronic device 100. At 702, the method includes registering system parameters associated with the electronic device 100 for each one of the determined services. In an embodiment, the method allows the system parameter detector 112 to register system parameters associated with the electronic device 100 for each one of the determined services. At 703, the method includes determine whether the service is critical or non-critical for the boot-up process. In an embodiment, the method allows the service detector 111 to determine whether the service is critical or non-critical for the boot-up process.

At 704, the method includes tagging the label data to each one of the determined services, where the label data represents whether the service is critical or non-critical. In an embodiment, the method allows the Label data tagger 113 to tag the label data to each one of the determined services, where the label data represents whether the service is critical or non-critical. At 705, the method includes clustering each of the services into one of the accelerating cluster and the decelerating cluster based on the registered system parameters associated with the electronic device 100 and the tagged label data. In an embodiment, the method allows the clustering engine 114 to cluster each of the services into one of the accelerating cluster and the decelerating cluster based on the registered system parameters associated with the electronic device 100 and the tagged label data.

At 706, the method includes detecting the subsequent boot-up process at the electronic device 100. In an embodiment, the method allows the service detector 111 to detect the subsequent boot-up process at the electronic device 100. At 707, the method includes determining the services available in the accelerating cluster and the services available in the decelerating cluster. In an embodiment, the method allows the service detector 111 to determine the services available in the accelerating cluster and the services available in the decelerating cluster.

At 708, the method includes scheduling the services available in the accelerating cluster using at least one big core and the services available in the decelerating cluster using at least one small core during the boot-up process. In an embodiment, the method allows the load balancer 115 to schedule the services available in the accelerating cluster using at least one big core and the services available in the decelerating cluster using at least one small core during the boot-up process. At 709, the method includes determining the plurality of new services initiated during the subsequent boot-up process of the electronic device 100. In an embodiment, the method allows the service detector 111 to determine the plurality of new services initiated during the subsequent boot-up process of the electronic device 100. At 710, the method includes register the system parameters associated with the electronic device 100 for each one of the determined new services during the subsequent boot-up process. In an embodiment, the method allows the system parameter detector 112 to register the system parameters associated with the electronic device 100 for each one of the determined new services during the subsequent boot-up process.

At 711, the method includes tagging the label data to each one of the determined new services during the subsequent boot-up process as critical or non-critical. In an embodiment, the method allows the label data tagger 113 to tag the label data to each one of the determined new services during the subsequent boot-up process as critical or non-critical. At 712, the method includes dynamically updating the determined services during the subsequent boot-up process in one of the accelerating cluster and the decelerating cluster based on the system parameters associated with the electronic device 100 for each one of the determined new services and the tagged label data during the subsequent boot-up process In an embodiment, the method allows the clustering engine 114 to dynamically update the determined services during the subsequent boot-up process in one of the accelerating cluster and the decelerating cluster based on the system parameters associated with the electronic device 100 for each one of the determined new services and the tagged label data during the subsequent boot-up process.

Figure 7D:
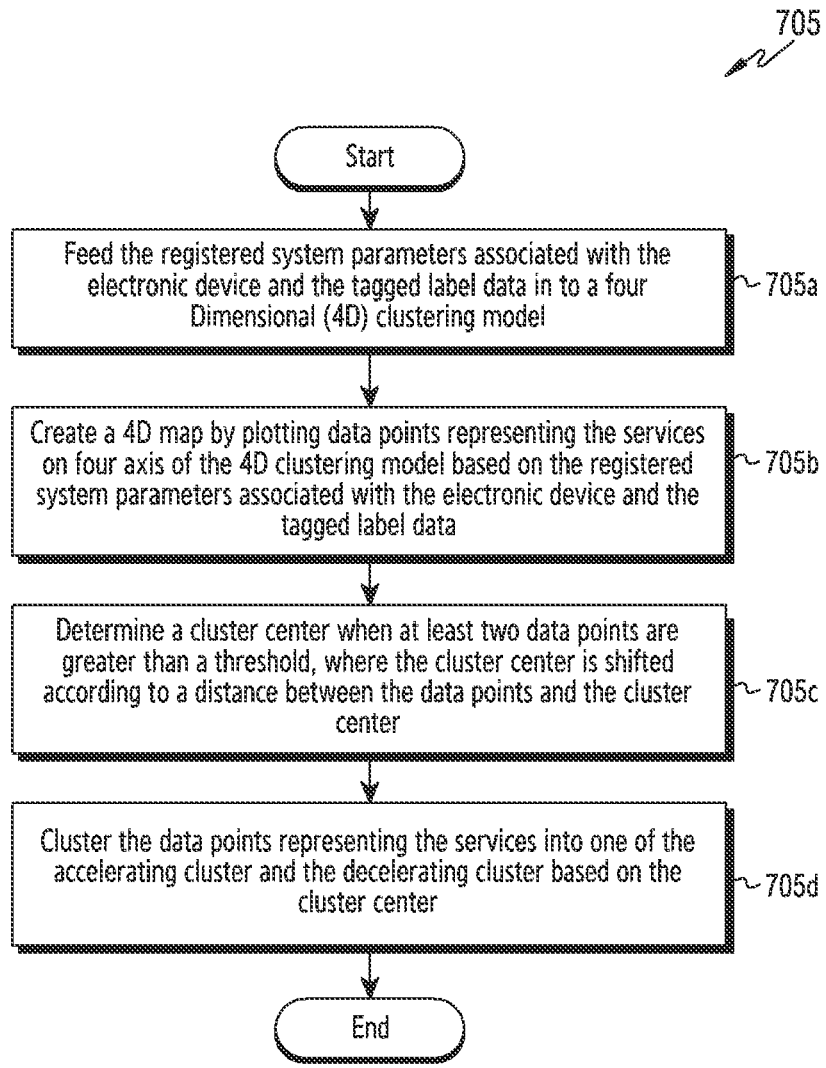
FIG. 7D is a flow diagram illustrating various steps in clustering each of the services into one of an accelerating cluster and a decelerating cluster, according to an embodiment as disclosed herein.

The various actions, acts, blocks, steps, or the like in the flow diagram 700 may be performed in the order presented, in a different order or simultaneously. Further, in some embodiments, some of the actions, acts, blocks, steps, or the like may be omitted, added, modified, skipped, or the like without departing from the scope of the invention FIG. 7D is a flow diagram 705 illustrating various steps in clustering each of the services into one of an accelerating cluster and a decelerating cluster, according to an embodiment as disclosed herein. At 705a, the method includes feeding the registered system parameters associated with the electronic device 100 and the tagged label data in to the 4D clustering model. In an embodiment, the method allows the feeder 114a to feed the registered system parameters associated with the electronic device 100 and the tagged label data in to the 4D clustering model. At 705b, the method includes creating the 4D map by plotting the data points representing the services on four axis of the 4D clustering model based on the registered system parameters associated with the electronic device 100 and the tagged label data. In an embodiment, the method allows the 4D cluster model 114b to create the 4D map by plotting the data points representing the services on four axis of the 4D clustering model based on the registered system parameters associated with the electronic device 100 and the tagged label data.

At 705c, the method includes determining the cluster center when at least two data points are greater than the threshold, where the cluster center is shifted according to the distance between the data points and the cluster center. In an embodiment, the method allows the cluster center estimator 114c to determine the cluster center when at least two data points are greater than the threshold, where the cluster center is shifted according to the distance between the data points and the cluster center. At 705d, the method includes clustering the data points representing the services into one of the accelerating cluster and the decelerating cluster based on the cluster center. In an embodiment, the method allows the accelerating cluster controller 114d and the decelerating cluster controller 114e to cluster the data points representing the services into one of the accelerating cluster and the decelerating cluster based on the cluster center.

Figure 8:
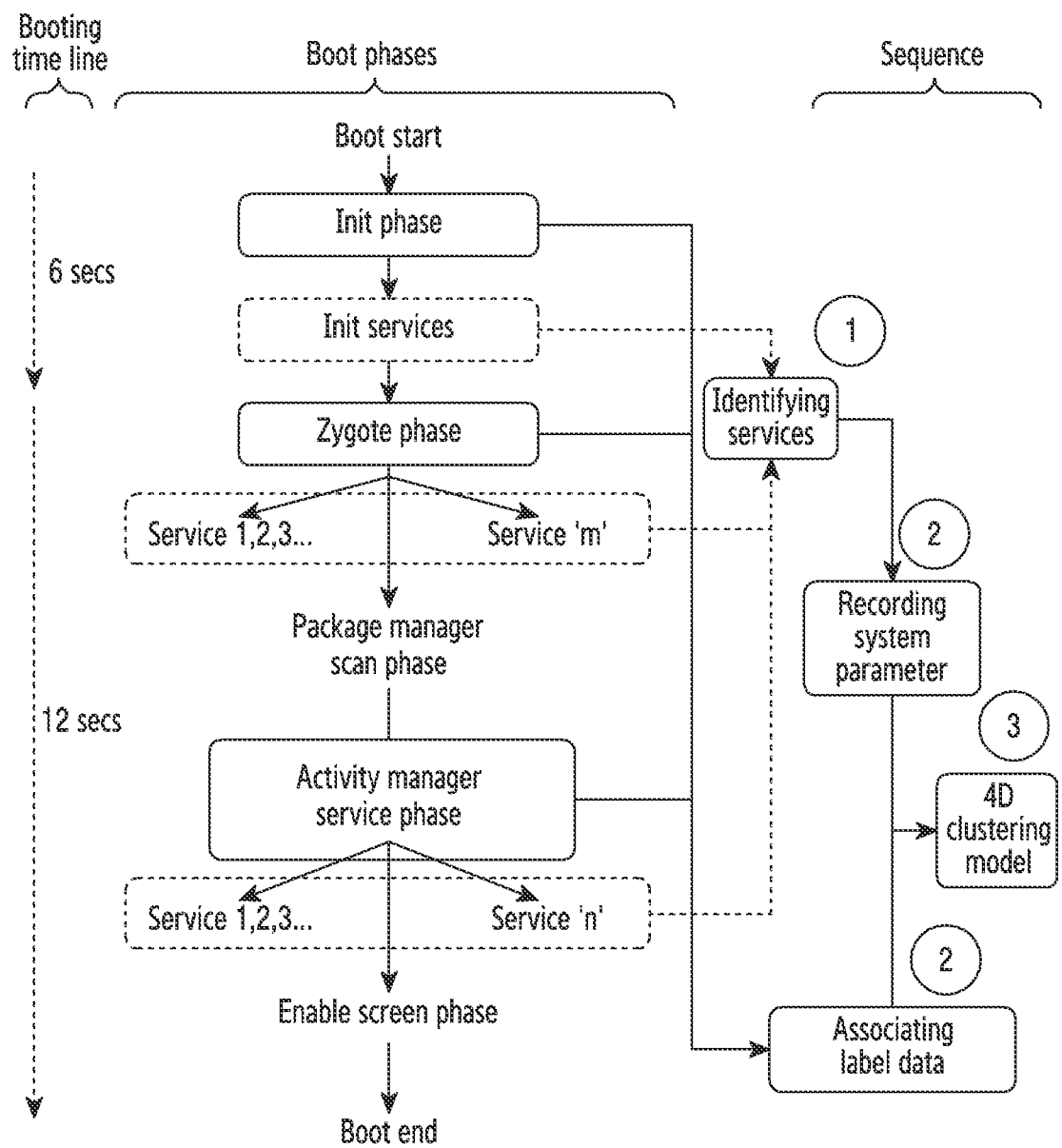
FIG. 8 is a schematic diagram illustrating a booting timeline for various booting phases, according to an embodiment as disclosed herein.

The various actions, acts, blocks, steps, or the like in the flow diagram 705 may be performed in the order presented, in a different order or simultaneously. Further, in some embodiments, some of the actions, acts, blocks, steps, or the like may be omitted, added, modified, skipped, or the like without departing from the scope of the invention FIG. 8 is a schematic diagram illustrating a booting time line for various booting phases, according to an embodiment as disclosed herein. The booting phases in the boot-up process include init phase, zygote phase, Package Manager Scan (PMS) phase and Activity Manager Service (AMS) phase. All daemons such as cameraserver, audioserver and the like, starts from the init phase. All classes and resources preload in the zygote phase. All non-native services such as application services etc. start from AMS phase.

The boot-up process starts with the init phase, where the services initiates during the init phase is called as init services. Further, the zygote phase of the boot-up process starts after completing the init phase, where an 'm' number of services initiates during the zygote phase is called as zygote services. The electronic device 100 takes 6 sec to complete the init phase. Further, the PMS phase of the boot-up process starts after completing the zygote phase. Further, the AMS phase of the boot-up process starts after completing the PMS phase, where an 'n' number of services initiates during the AMS phase is called as AMS services. The boot-up process completes by enabling the screen of the electronic device 100 for normal operations, after the completion of the AMS phase. The electronic device 100 takes 12 sec to complete the AMS phase from the zygote phase.

At step 1, the electronic device 100 identifies the plurality of services includes the init services, zygote services and the AMS services, initiated during the boot-up process. At step 2, the electronic device 100 records the system parameters and the associate the label data of each of the identified services. In an embodiment, the system parameters includes the CPU load, the parallelizability factor and the memory utilization factor. The electronic device 100 records the system parameters by registering the system parameters for each of the identified services. Further, the electronic device 100 tag the label data to the identified services based on criticality of the service. At step 3, the electronic device 100 generates the 4D map in the 4D clustering model using the identified services. The 4D map is generated by plotting the corresponding data points of the system parameters and the label data of each services on the four axis of the 4D clustering model. Further, the electronic device 100 determining the cluster center, where the cluster center is shifted according to the distance between the data points and the cluster center. Further, the electronic device 100 cluster the data points representing the services into one of the accelerating cluster and the decelerating cluster based on the cluster center. Further, the electronic device 100 schedules the services available in the accelerating cluster using the big core and the services available in the decelerating cluster using the small core, during the subsequent boot-up process.

Figure 9:
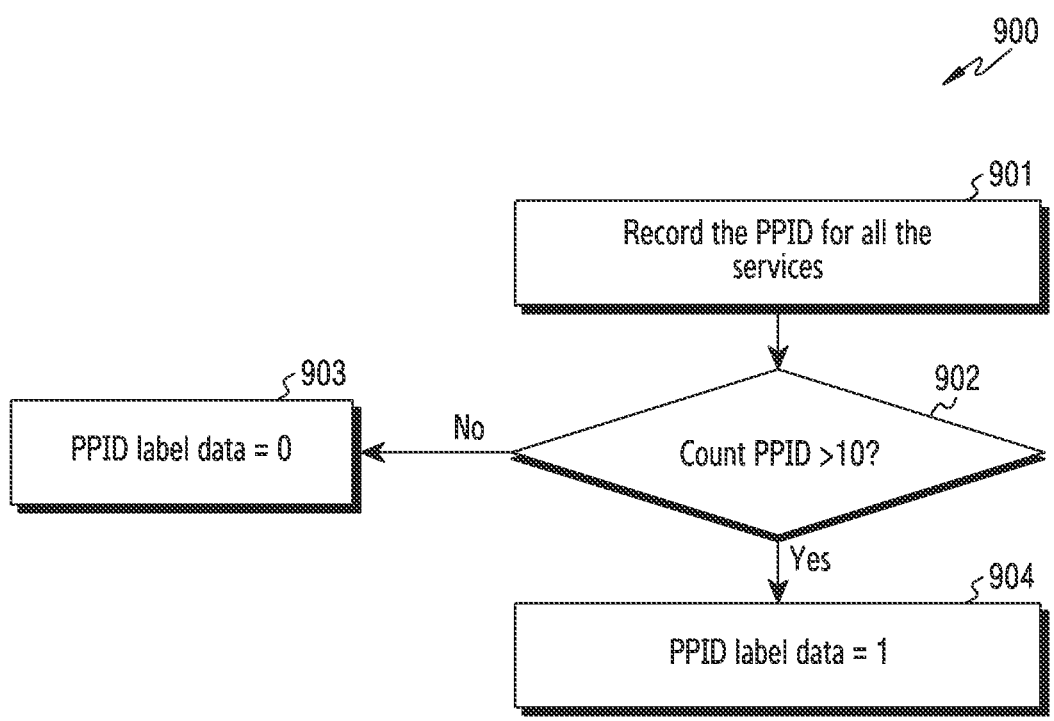
FIG. 9 is a flow diagram illustrating various steps in tagging a label data to the services, according to an embodiment as disclosed herein.

FIG. 9 is a flow diagram 900 illustrating various steps in tagging the label data to the services, according to an embodiment as disclosed herein. At 901, tagging the label data to the services includes recording the PPID for all the identified services. In an embodiment, the method allows the system parameter detector 112 to recording the PPID for all the services. At 902, tagging the label data to the services includes determining whether the count of the PPID is greater than 10. In an embodiment, the method allows the label data tagger 113 to determine whether the count of the PPID is greater than 10. At 903, tagging the label data to the services includes setting the value of the label data as zero, in response to determining that the count of the PPID is not greater than 10. In an embodiment, the method allows the label data tagger 113 to set the value of the label data as zero, in response to determining that the count of the PPID is not greater than 10. At 904, tagging the label data to the services includes setting the value of the label data as one, in response to determining that the count of the PPID is greater than 10. In an embodiment, the method allows the label data tagger 113 to set the value of the label data as one, in response to determining that the count of the PPID is greater than 10.

The various actions, acts, blocks, steps, or the like in the flow diagram 900 may be performed in the order presented, in a different order or simultaneously. Further, in some embodiments, some of the actions, acts, blocks, steps, or the like may be omitted, added, modified, skipped, or the like without departing from the scope of the invention.

FIG. 10A illustrates an example scenario of clustering the services to one of the accelerating cluster and the decelerating cluster, according to an embodiment as disclosed herein. Consider the electronic device 100 is performing the boot-up process. The electronic device 100 identifies the plurality of services initiated during the boot-up process. Further, the electronic device 100 generates the value matrix by registering the system parameters in the value matrix. Consider, the user install the messenger application in the electronic device 100. The electronic device 100 identifies the new service (e.g., messengerapp) that initiated due to installation of the new application (e.g., messenger application) in the electronic device 100 and the other identified services. The new service is the messengerapp and the other services are systemserver, zygot64, cameraserver, nfc, Bluetooth, audioserver, messaging and incallui.

The electronic device 100 clusters the services includes the systemserver, the zygot64 and the cameraserver into the accelerating cluster by giving the cluster value as one. The electronic device 100 clusters the services includes the NFC, the Bluetooth, the audioserver, the messaging and the incallui into the decelerating cluster by giving the cluster value as two. The cluster value of the messengerapp is 'new', indicates that the messengerapp is the new service which need to initiate during the next boot-up process. The electronic device 100 performs the reward feedback method on the messengerapp to determine the cluster value of the messengerapp for clustering the messengerapp to one of the accelerating cluster and the decelerating cluster.

Figure 10B:
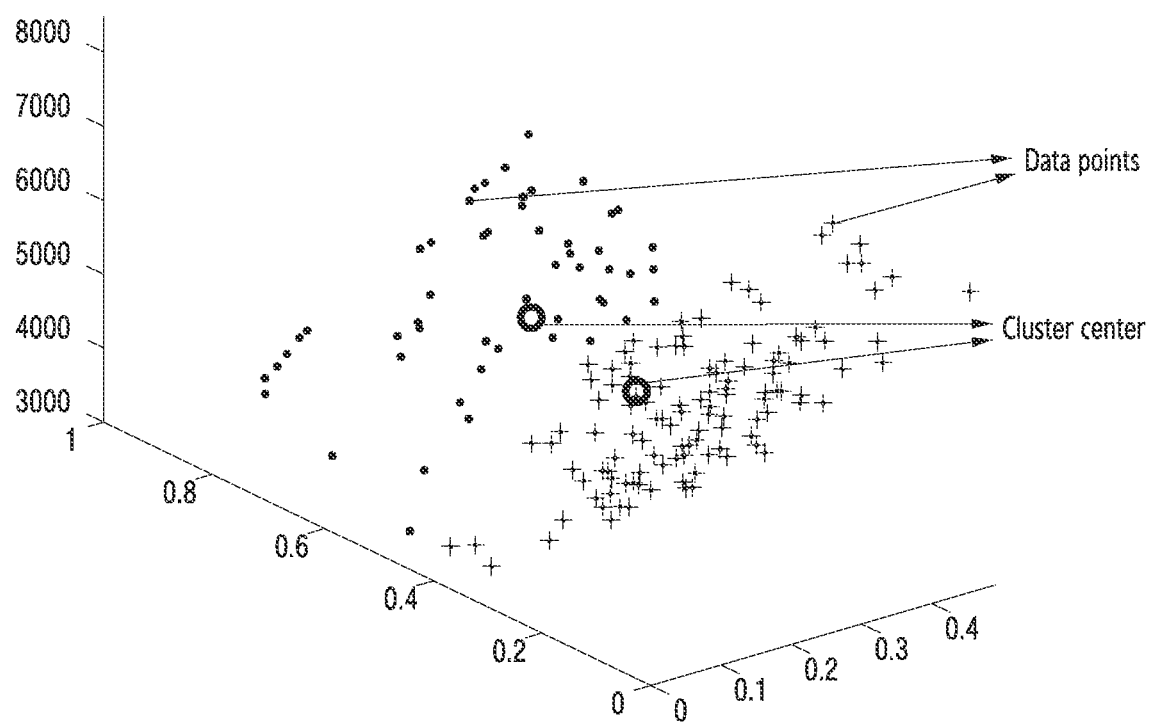
FIG. 10B illustrates plotting of data points and cluster centers in a 3D model, according to an embodiment as disclosed herein.

FIG. 10B illustrates plotting of the data points and the cluster centers in a 3D model, according to an embodiment as disclosed herein. The electronic device 100 plots the corresponding data points of the system parameters and the label data of each identified services in the 4D clustering model. Further, the electronic device 100 determines the cluster center of the accelerating cluster and the decelerating cluster based on the distance of each data points with the cluster center.

Figure 10C:
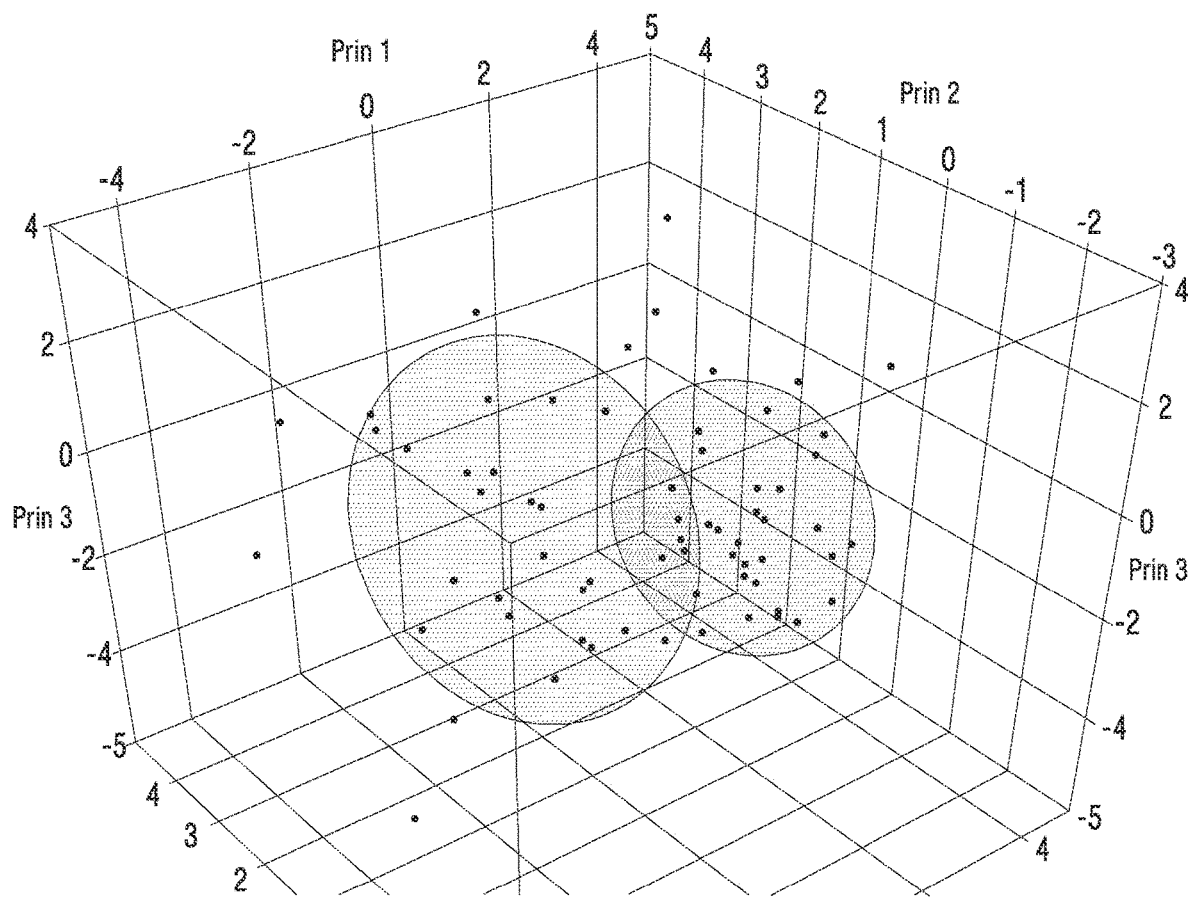
FIG. 10C is a schematic diagram illustrating the accelerating cluster and the decelerating cluster in a 4D clustering model, according to an embodiment as disclosed herein.

FIG. 10C is a schematic diagram illustrating the accelerating cluster and the decelerating cluster in the 4D clustering model, according to an embodiment as disclosed herein. The electronic device 100 plots the data points of the services in the 4D clustering model to generate the 4D map. The X-axis in the four axis of the 4D clustering model represents the CPU load, the Y-axis in the four axis of the 4D clustering model represents the memory utilization factor, the Z-axis in the four axis of the 4D clustering model represents the parallelizability factor and the W-axis in the four axis of the 4D clustering model represents the label data. Further, the electronic device 100 cluster the services to one of the accelerating cluster and the decelerating cluster, where a smaller sphere in the FIG. 10C represents the accelerating cluster and a larger sphere in the FIG. 10C represents the decelerating cluster.

Figure 11:
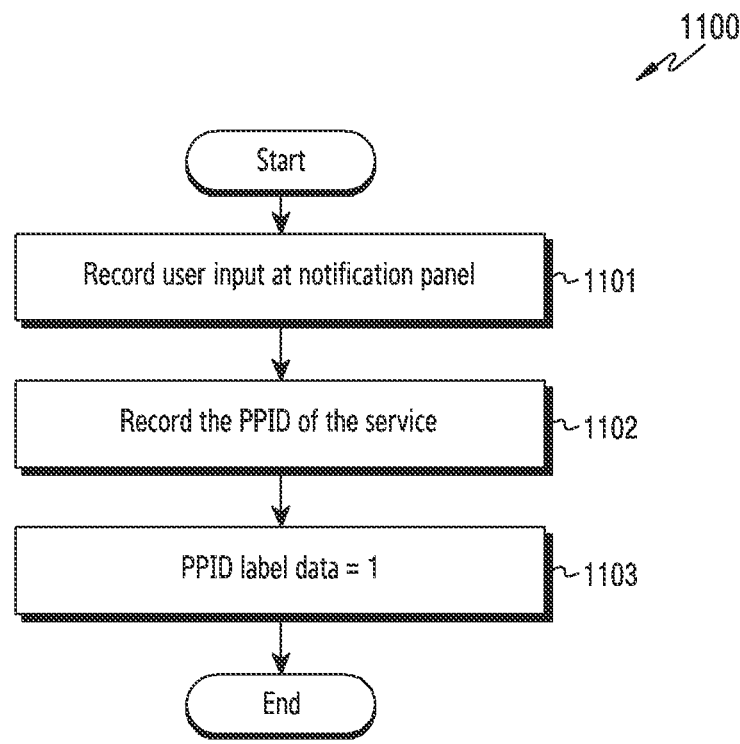
FIG. 11 is a flow diagram illustrating various steps in tagging the label data to the services based on enabling/disabling of the service in a notification panel of the electronic device, according to an embodiment as disclosed herein.

FIG. 11 is a flow diagram 1100 illustrating various steps in tagging the label data to the services based on enabling/disabling of the service in the notification panel of the electronic device 100, according to an embodiment as disclosed herein. At 1101, tagging the label data to the services based on enabling/disabling of the service in the notification panel includes recording the user input of enabling/disabling of the service at the notification panel. In an embodiment, the method allows the notification panel manager 116 to record the user input of enabling/disabling of the service at the notification panel. At 1102, tagging the label data to the services based on enabling/disabling of the service in the notification panel includes recording the PPID of the service. In an embodiment, the method allows the system parameter detector 112 to record the PPID of the service. At 1103, tagging the label data to the services based on enabling/disabling of the service in the notification panel includes updating the PPID label data as one for the service. In an embodiment, the method allows the label data tagger 113 to update the PPID label data as one for the service.

The various actions, acts, blocks, steps, or the like in the flow diagram 1100 may be performed in the order presented, in a different order or simultaneously. Further, in some embodiments, some of the actions, acts, blocks, steps, or the like may be omitted, added, modified, skipped, or the like without departing from the scope of the invention.

FIG. 12 illustrates an example scenario of dynamically updating the services enabled/disabled in the notification panel to one of the accelerating cluster and the decelerating cluster during the subsequent boot-up process, according to an embodiment as disclosed herein. Consider the user enables/disables the Bluetooth service in the notification panel of the electronic device 100 after the booting. The electronic device 100 detects the enabling/disabling of the Bluetooth service and detects that the Bluetooth service is the important service to initiate during the next boot-up. Further, the electronic device 100 performs the reward feedback method on the Bluetooth service to determine whether the initiation of the Bluetooth service during the next boot-up deteriorates the booting time. In response to determining that the initiation of the Bluetooth service during the next boot-up does not deteriorate the booting time, the electronic device 100 updates the cluster value of the Bluetooth service as one. Updating the cluster value of the Bluetooth service as one indicates that the Bluetooth service is clustered to the accelerating cluster for the next boot-up process.

Figure 13:
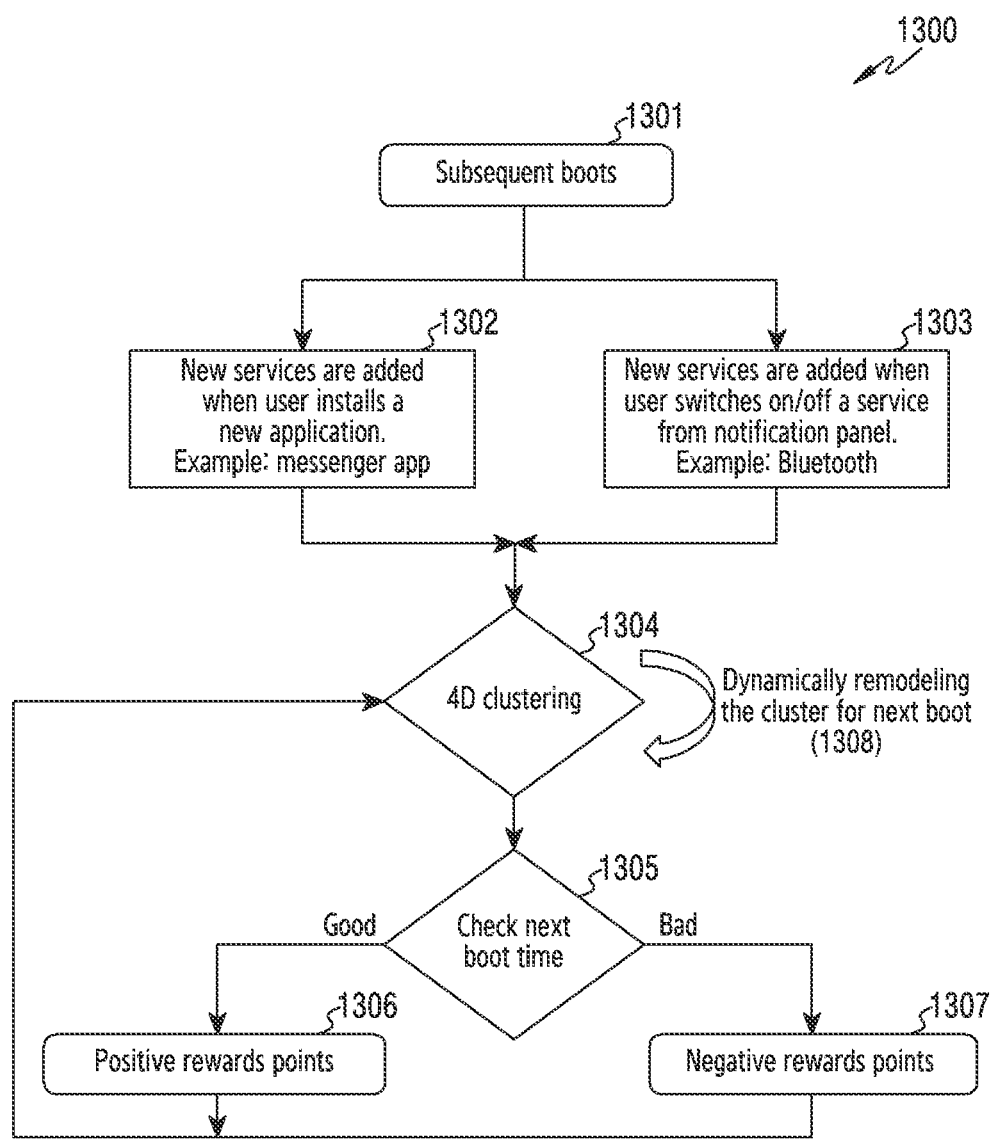
FIG. 13 is a flow diagram illustrating various steps in dynamically updating the services or new services to one of the accelerating cluster and the decelerating cluster during the subsequent boot-up process, according to an embodiment as disclosed herein.

FIG. 13 is a flow diagram 1300 illustrating various steps in dynamically updating the services or new services to one of the accelerating cluster and the decelerating cluster during the subsequent boot-up process, according to an embodiment as disclosed herein. At 1301, dynamically updating the services or new services includes detecting the subsequent boot-up process at the electronic device 100. In an embodiment, the method allows the service detector 111 to detecting the subsequent boot-up process at the electronic device 100. At 1302, dynamically updating the services or new services includes detecting the new services that are added when the user installs the new application (e.g., messenger app). In an embodiment, the method allows the service detector 111 to detect the new services that are added when the user installs the new application. At 1303, dynamically updating the services or new services includes detecting the new services that are added when the user switches on/off the service from the notification panel. In an embodiment, the method allows the notification panel manager 116 to detect the new services that are added when the user switches on/off the service from the notification panel.

At 1304, dynamically updating the services or new services includes performing 4D clustering for the new services. In an embodiment, the method allows the clustering engine 114 to perform the 4D clustering for the new services. At 1305, dynamically updating the services or new services includes checking the next boot time of the electronic device 100, upon clustering the new service to the accelerating cluster. In an embodiment, the method allows the clustering engine 114 to check the next boot time of the electronic device 100, upon clustering the new service to the accelerating cluster. At 1306, dynamically updating the services or new services includes providing the positive reward points for the new services, in response to detecting that the booting time is optimized (good), when the new service is clustered to the accelerating cluster. In an embodiment, the method allows the clustering engine 114 to provide the positive reward points for the new services, in response to detecting that the booting time is optimized (good), when the new service is clustered to the accelerating cluster.

At 1307, dynamically updating the services or new services includes providing the negative reward points for the new services, in response to detecting that the booting time is not optimized (bad), when the new service is clustered to the accelerating cluster. In an embodiment, the method allows the clustering engine 114 to provide the negative reward points for the new services, in response to detecting that the booting time is not optimized (bad), when the new service is clustered to the accelerating cluster. At 1308, dynamically updating the services or new services includes dynamically remodeling the cluster for next boot based on the positive reward point/negative reward point. In an embodiment, the method allows the clustering engine 114 to dynamically remodel the cluster for next boot based on the positive reward point/negative reward point.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for managing scheduling of services during a boot-up process in an electronic device comprising a multi-core processor including at least one big core and at least one small core, comprising:
   identifying, by the electronic device, a plurality of services initiated during the boot-up process of the electronic device;
   registering system parameters associated with the electronic device for each of the plurality of services;

determining, by the electronic device, a criticality of each of the plurality of services for the boot-up process, wherein the criticality indicates whether each of the plurality of services is critical or non-critical for the boot-up process;

tagging label data to each of the plurality of services, wherein the label data represents whether each of the plurality of services is critical or non-critical;

clustering, by the electronic device, each of the plurality of services into an accelerating cluster or a decelerating cluster based on the registered system parameters associated with the electronic device for each of the plurality of services and the tagged label data to each of the plurality of services; and booting the electronic device by assigning the services to the at least one big core and the at least one small core based on the clustering, wherein a service of the plurality of services is determined as critical for the boot-up process based on that the service is enabled or disabled by a user input in a notification settings screen of the electronic device.

2. The method of claim 1, further comprising:

detecting a subsequent boot-up process in the electronic device;

determining first services available in the accelerating cluster and second services available in the decelerating cluster; and scheduling, during the subsequent boot-up process, the first services based on at least one big core of the multi-core processor and the second services based on at least one small core of the multi-core processor.

3. The method of claim 2, further comprising:

determining a plurality of new services initiated during the subsequent boot-up process of the electronic device;

registering system parameters associated with the electronic device for each of the plurality of new services during the subsequent boot-up process;

tagging label data to each of the plurality of new services during the subsequent boot-up process based on a criticality of each of the plurality of new services; and dynamically updating each of the plurality of new services during the subsequent boot-up process in the accelerating cluster or the decelerating cluster based on the system parameters associated with the electronic device for each of the plurality of new services and the tagged label data to each of the plurality of new services.

4. The method of claim 1, wherein the system parameters associated with the electronic device comprise at least one of a central processing unit (CPU) load, a parallelizability factor, or a memory utilization factor.

5. The method of claim 1, wherein the clustering of each of the plurality of services comprises:

feeding the registered system parameters associated with the electronic device for each of the plurality of services and the tagged label data to each of the plurality of services into a four dimensional (4D) clustering model;

creating a 4D map by plotting data points representing the plurality of services on four axes of the 4D clustering model based on the registered system parameters associated with the electronic device for each of the plurality of services and the tagged label data to each of the plurality of services;

determining a cluster center if at least two data points are greater than a threshold, wherein the cluster center is determined based on a distance between the data points and the cluster center; and clustering the data points representing the plurality of services into the accelerating cluster or the decelerating cluster based on the cluster center.

6. The method of claim 5, wherein a first axis of the 4D clustering model represents a central processing unit (CPU) load, a second axis of the 4D clustering model represents a memory utilization factor, a third axis of the 4D clustering model represents a parallelizability factor, and a fourth axis of the 4D clustering model represents the label data.

7. The method of claim 1, wherein a service of the plurality of services is determined as critical for the boot-up process if the service initiates a predefined number of other services, and wherein the service is determined as non-critical for the boot-up process if the service does not initiate the predefined number of other services.

8. A method for managing scheduling of services during a boot-up process in an electronic device comprising a multi-core processor including at least one big core and at least one small core, comprising:

determining, by the electronic device, a criticality of each of a plurality of services for the boot-up process, wherein the criticality indicates whether each of the plurality of services is critical or non-critical for the boot-up process;

detecting an initiation of the boot-up process in the electronic device;

identifying, by the electronic device, first services available in an accelerating cluster and second services available in a decelerating cluster based on the criticality of each of the plurality of services;

scheduling, during the boot-up process, the first services based on at least one big core of the multi-core processor and the second services based on at least one small core of the multi-core processor;

shifting a cluster center if at least two data points are greater than a threshold, the at least two data points out of a plurality of data points representing the plurality of services, wherein the cluster center is shifted based on a distance between the plurality of data points and the cluster center;

clustering the plurality of data points into the accelerating cluster or the decelerating cluster based on the cluster center; and booting the electronic device by assigning the services to the at least one big core and the at least one small core based on the clustering, wherein a service of the plurality of services is determined as critical for the boot-up process based on that the service is enabled or disabled by a user input in a notification settings screen of the electronic device.

9. The method of claim 8, further comprising:

identifying the plurality of services initiated during the boot-up process of the electronic device, wherein the plurality of services comprise the first services and the second services;

registering system parameters associated with the electronic device for each of the plurality of services;

tagging label data to each of the plurality of services, wherein the label data represents whether each of the plurality of services is critical or non-critical;

feeding the registered system parameters associated with the electronic device for each of the plurality of services and the tagged label data to each of the plurality of services into a four-dimensional (4D) clustering model; and creating a 4D map by plotting the plurality of data points representing the plurality of services on four axes of the 4D clustering model based on the registered system parameters associated with the electronic device for each of the plurality of services and the tagged label data to each of the plurality of services.

10. The method of claim 9, wherein a first axis of the 4D clustering model represents a central processing unit (CPU) load, a second axis of the 4D clustering model represents a memory utilization factor, a third axis of the 4D clustering model represents a parallelizability factor, and a fourth axis of the 4D clustering model represents the label data.

11. The method of claim 8, further comprising:
determining a plurality of new services initiated during a subsequent boot-up process of the electronic device;
registering system parameters associated with the electronic device for each of the plurality of new services during the subsequent boot-up process;
tagging label data to each of the plurality of new services during the subsequent boot-up process based on a criticality of each of the plurality of new services; and
dynamically updating each of the plurality of new services during the subsequent boot-up process in the accelerating cluster or the decelerating cluster based on the system parameters associated with the electronic device for each of the plurality of new services and the tagged label data to each of the plurality of new services.

12. The method of claim 9, wherein the system parameters associated with the electronic device comprise at least one of a central processing unit (CPU) load, a parallelizability factor, or a memory utilization factor.

13. The method of claim 9, wherein a service of the plurality of services is determined as critical for the boot-up process if the service initiates a predefined number of other services, or the service is enabled or disabled in a notification panel of the electronic device, and wherein the service is determined as non-critical for the boot-up process if the service does not initiate the predefined number of other services.

14. An electronic device for managing scheduling of services during a boot-up process in the electronic device comprising:
a memory;
a multi-core processor including at least one big core and at least one small core; and
a scheduler operatively coupled to the memory and the multi-core processor, the scheduler being configured to:
identify a plurality of services initiated during the boot-up process of the electronic device,
register system parameters associated with the electronic device for each of the plurality of services,
determine a criticality of each of the plurality of services for the boot-up process, wherein the criticality indicates whether each of the plurality of services is critical or non-critical for the boot-up process,
tag label data to each of the plurality of services, wherein the label data represents whether each of the plurality of services is critical or non-critical, and
cluster each of the plurality of services into an accelerating cluster or a decelerating cluster based on the registered system parameters associated with the electronic device for each of the plurality of services and the tagged label data to each of the plurality of services,
boot the electronic device by assigning the services to the at least one big core and the at least one small core based on the clustering,
wherein a service of the plurality of services is determined as critical for the boot-up process based on that the service is enabled or disabled by a user input in a notification settings screen of the electronic device.

15. The electronic device of claim 14, wherein the scheduler is further configured to:
detect a subsequent boot-up process in the electronic device,
determine first services available in the accelerating cluster and second services available in the decelerating cluster, and
schedule, during the subsequent boot-up process, the first services based on at least one big core of the multi-core processor and the second services based on at least one small core of the multi-core processor.

16. The electronic device of claim 15, wherein the scheduler is further configured to:
determine a plurality of new services initiated during the subsequent boot-up process of the electronic device,
register system parameters associated with the electronic device for each of the plurality of new services during the subsequent boot-up process,
tag label data to each of the plurality of new services during the subsequent boot-up process based on a criticality of each of the plurality of new services, and
dynamically update each of the plurality of new services during the subsequent boot-up process in the accelerating cluster or the decelerating cluster based on the system parameters associated with the electronic device for each of the plurality of new services and the tagged label data to each of the plurality of new services.

17. The electronic device of claim 14, wherein the system parameters associated with the electronic device comprise at least one of a central processing unit (CPU) load, a parallelizability factor, or a memory utilization factor.

18. The electronic device of claim 14, wherein the scheduler is further configured to:
feed the registered system parameters associated with the electronic device for each of the plurality of services and the tagged label data to each of the plurality of services into a four-dimensional (4D) clustering model,
create a 4D map by plotting data points representing the plurality of services on four axes of the 4D clustering model based on the registered system parameters associated with the electronic device for each of the plurality of services and the tagged label data to each of the plurality of services,
determine a cluster center if at least two data points are greater than a threshold, wherein the cluster center is determined based on a distance between the data points and the cluster center, and
cluster the data points representing the plurality of services into the accelerating cluster or the decelerating cluster based on the cluster center.

19. The electronic device of claim 18, wherein a first axis of the 4D clustering model represents a central processing unit (CPU) load, a second axis of the 4D clustering model represents a memory utilization factor, a third axis of the 4D clustering model represents a parallelizability factor, and a fourth axis of the 4D clustering model represents the label data.

20. The electronic device of claim 14,
   wherein a service of the plurality of services is determined as critical for the boot-up process if the service initiates a predefined number of other services, and
   wherein the service is determined as non-critical for the boot-up process if the service does not initiate the predefined number of other services.

* * * * *